United States Patent
Ji et al.

(10) Patent No.: US 8,802,329 B2
(45) Date of Patent: Aug. 12, 2014

(54) ELECTRODE CONTAINING NANOSTRUCTURED THIN CATALYTIC LAYERS AND METHOD OF MAKING

(75) Inventors: Chunxin Ji, Pennfield, NY (US); Matthew Dioguardi, Rochester, NY (US)

(73) Assignee: GM Global Technology Operations LLC, Detroit, MI (US)

(*) Notice: Subject to any disclaimer, the term of this patent is extended or adjusted under 35 U.S.C. 154(b) by 781 days.

(21) Appl. No.: 12/465,913

(22) Filed: May 14, 2009

(65) Prior Publication Data

US 2010/0291463 A1    Nov. 18, 2010

(51) Int. Cl.
*H01M 4/02*    (2006.01)
*H01M 4/36*    (2006.01)
*H01M 4/62*    (2006.01)
*H01M 8/00*    (2006.01)

(52) U.S. Cl.
USPC ............................ 429/535; 429/523; 429/532

(58) Field of Classification Search
None
See application file for complete search history.

(56) References Cited

U.S. PATENT DOCUMENTS

| | | | |
|---|---|---|---|
| 4,812,352 A | 3/1989 | Debe | |
| 4,940,854 A | 7/1990 | Debe | |
| 5,039,561 A | 8/1991 | Debe | |
| 5,175,030 A | 12/1992 | Lu et al. | |
| 5,238,729 A | 8/1993 | Debe | |
| 5,273,615 A * | 12/1993 | Asetta et al. | 156/750 |
| 5,336,558 A | 8/1994 | Debe | |
| 5,338,430 A | 8/1994 | Parsonage et al. | |
| 5,674,592 A | 10/1997 | Clark et al. | |
| 5,879,827 A | 3/1999 | Debe et al. | |
| 5,879,828 A | 3/1999 | Debe et al. | |

(Continued)

FOREIGN PATENT DOCUMENTS

| CN | 1433358 A | 7/2003 |
|---|---|---|
| CN | 1471186 A | 1/2004 |

(Continued)

OTHER PUBLICATIONS

Chia-Liang Sun, et al., Unltrafine Platinum Nanoparticles Uniformly Dispersed on Arrayed CNx Nanotubes With High Electrochemical Activity, 2005 American Chemical Society, vol. 17, pp. 3749-3753, USA.

(Continued)

*Primary Examiner* — Emily Le
*Assistant Examiner* — Michael Forrest
(74) *Attorney, Agent, or Firm* — Dinsmore & Shohl LLP

(57) ABSTRACT

A method of transferring a nanostructured thin catalytic layer from its carrying substrate to a porous transfer substrate and further processing and restructuring the nanostructured thin catalytic layer on the porous transfer substrate is provided. The method includes transferring the nanostructured catalytic layer from its carrying substrate to a transfer substrate. The nanostructured catalytic layer then is processed and reconstructed, including removing the residual materials and adding additional components or layers to the nanostructured catalytic layer, on the transfer substrate. Methods of fabricating catalyst coated membranes with the reconstructed electrode including the nanostructured thin catalytic layer, reconstructed electrode decals, and catalyst coated proton exchange membranes are also described.

19 Claims, 23 Drawing Sheets

(56) References Cited

U.S. PATENT DOCUMENTS

| | | | |
|---|---|---|---|
| 6,238,534 | B1 | 5/2001 | Mao et al. |
| 6,482,763 | B2 | 11/2002 | Haugen et al. |
| 6,521,324 | B1 | 2/2003 | Debe et al. |
| 6,524,736 | B1 * | 2/2003 | Sompalli et al. ............. 429/535 |
| 6,669,801 | B2 * | 12/2003 | Yoshimura et al. ........... 156/230 |
| 6,770,337 | B2 | 8/2004 | Debe et al. |
| 7,041,373 | B2 | 5/2006 | Mukasa et al. |
| 7,419,741 | B2 | 9/2008 | Vernstrom et al. |
| 2003/0022403 | A1 * | 1/2003 | Shimoda et al. ................ 438/14 |
| 2005/0067345 | A1 * | 3/2005 | Prugh et al. ............. 210/500.27 |
| 2005/0095494 | A1 | 5/2005 | Fuss et al. |
| 2005/0233198 | A1 * | 10/2005 | Nuzzo et al. .................... 429/34 |
| 2006/0204831 | A1 | 9/2006 | Yan et al. |
| 2007/0059452 | A1 | 3/2007 | Debe et al. |
| 2007/0059573 | A1 | 3/2007 | Debe et al. |
| 2007/0082256 | A1 | 4/2007 | Debe et al. |
| 2007/0082814 | A1 | 4/2007 | Debe et al. |
| 2007/0199649 | A1 | 8/2007 | Sompalli et al. |
| 2008/0020253 | A1 | 1/2008 | Neubert et al. |
| 2008/0020261 | A1 * | 1/2008 | Hendricks et al. ............... 429/40 |
| 2008/0020923 | A1 | 1/2008 | Debe et al. |
| 2008/0128074 | A1 | 6/2008 | Mah et al. |
| 2008/0143061 | A1 | 6/2008 | Steinbach et al. |
| 2008/0145712 | A1 | 6/2008 | Pierpont et al. |
| 2008/0182150 | A1 * | 7/2008 | De Haan et al. ................ 429/34 |

FOREIGN PATENT DOCUMENTS

| | | |
|---|---|---|
| CN | 1560949 A | 1/2005 |
| CN | 101263619 A | 9/2008 |
| EP | 1 381 102 A2 | 1/2004 |
| WO | 0139986 A1 | 6/2001 |
| WO | 2007032903 A2 | 3/2007 |

OTHER PUBLICATIONS

Scott C. Warren, et al., Ordered Mesoporous Materials from Metal Nanoparticle-Block Copolymer Self-Assembly, www.sciencemag.org, vol. 320, Jun. 27, 2008, pp. 1748-1752, USA.

Mark K. Debe, et al., Advanced MEAs for Enhanced Operating Conditions, FY 2005 Progress Report, DOE Hydrogen Program, pp. 730-738.

T. Hatanaka, et al., PEFC Electrodes Based on Vertically Oriented Carbon Nanotubes, Toyota Motor Corporation, 210th ECS Meeting, Abstract #549, copyright ECS, Oct. 2006, 1 page.

Mark K. Debe, Advanced MEAs for Enhanced Operating Conditions, Amenable to High Volume Manufacture, 3M/DOE Cooperative Agreement No. DE-FC36-02AL67621, Fuel Components Program, 3M Company, May 24, 2004, pp. 1-27.

Mark K. Debe, NanoStructured Thin Film Catalysts (NSTFC) for Next Generation PEM Fuel Cells, Fuel Cell Components Program, Northern Nano Workshop, Nov. 9, 2006, University of Minnesota, pp. 1-38.

Non-Final Office Action dated 11/19/12 pertaining to U.S. Appl. No. 12/718,306 filed Mar. 5, 2010.

Non-Final Office Action dated 11/26/12 pertaining to U.S. Appl. No. 12/718,330 filed Mar. 5, 2010.

Non-Final Office Action dated Jun. 22, 2012 pertaining to U.S. Appl. No. 12/788,915 filed May 27, 2010.

Final Office Action dated Dec. 12-18 2012 pertaining to U.S. Appl. No. 12/788,915 filed May 27, 2010.

Non-Final Office Action dated Feb. 01, 2013 pertaining to U.S. Appl. No. 12/701,095 filed Feb. 05, 2010.

* cited by examiner 100 nm 100 nm

ELECTRODE CONTAINING NANOSTRUCTURED THIN CATALYTIC LAYERS AND METHOD OF MAKING

FIELD OF THE INVENTION

The present invention relates generally to electrodes for fuel cells, and specifically to electrodes containing nanostructured thin catalytic layers, and methods of making them.

BACKGROUND OF THE INVENTION

Electrochemical conversion cells, commonly referred to as fuel cells, produce electrical energy by processing reactants, for example, through the oxidation and reduction of hydrogen and oxygen. A typical polymer electrolyte fuel cell comprises a polymer membrane (e.g., a proton exchange membrane (PEM)) with catalyst layers on both sides. The catalyst coated PEM is positioned between a pair of gas diffusion media layers, and a cathode plate and an anode plate are placed outside the gas diffusion media layers. The components are compressed to form the fuel cell.

The currently widely used fuel cell electrocatalysts are platinum nanoparticles supported on carbon supports. Depending on the catalysts and loading, the electrodes prepared with carbon supported platinum catalysts normally have thickness from several microns to about 10 or 20 microns with porosities varying from 30% to 80%. One of the disadvantages of these carbon supported catalysts is the poor corrosion resistance of carbon under certain fuel cell operating conditions, which results in fast performance degradation.

The catalyst layers can be made of nanostructured thin support materials. The nanostructured thin support materials have particles or thin films of catalyst on them. The nanostructure thin catalytic layers can be made using well known methods. One example of a method for making nanostructured thin catalytic layers is described in U.S. Pat. Nos. 4,812,352. 4,940,854, 5,039,561, 5,175,030, 5,238,729, 5,336,558, 5,338,430, 5,674,592, 5,879,827, 5,879,828, 6,482,763, 6,770,337, and 7,419,741, and U.S. Publication Nos. 2007/0059452, 2007/0059573, 2007/0082256, 2007/0082814, 2008/0020261, 2008/0020923, 2008/0143061, and 2008/0145712, which are incorporated herein by reference. The basic process involves depositing a material on a substrate, such as polyimide, and annealing the deposited material to form a layer of nanostructured support elements, known as whiskers. One example of a material which can be used to form the nanostructured support elements is "perylene red" (N,N'-di(3,5-xylyl)perylene-3,4,9,10 bis(dicarboximide) (commercially available under the trade designation "C. I. PIGMENT RED 149" from American Hoechst Corp. of Somerset, N.J.)). A catalyst material is then deposited on the surface of nanostructured support elements to form a nanostructured thin film (NSTF) catalyst layer, which is available from 3M.

The nanostructured thin catalytic layers can be transferred directly to a proton exchange membrane, such as a Nafion® membrane, using a hot press lamination process, for example. The polyimide substrate is then peeled off, leaving the layer of whiskers attached to the membrane.

These types of nanostructured thin catalytic layers have demonstrated high catalytic activities, which is helpful to reduce the platinum utilization in fuel cell stacks. Most importantly, because the supporting layer is not made of carbon as in the traditional platinum catalysts for fuel cell application, the nanostructured thin catalytic layers are more resistant to corrosion under certain fuel cell operating conditions, and thus improve the fuel cell's durability.

However, after the annealing process is completed, a thin layer of residual non-crystallized perylene red remains at the surface of the polyimide substrate. Therefore, when the whiskers have been transferred to the PEM and the polyimide substrate peeled off, the surface of the whiskers that was adjacent to the polyimide substrate is exposed and becomes the surface of membrane electrode assembly (MEA). Consequently, the residual non-crystallized perylene red backing, which originally was adjacent to the polyimide substrate, is exposed. This can be detrimental to the fuel cell operation because it can block water and gas transfer in and out of the electrode.

In addition, an MEA made with this type of whisker catalyst layer has a narrow range of operating conditions (i.e., they cannot be too dry or too wet) to provide good performance. If the fuel cell is operated under wet conditions, the thin layer of whiskers, which is less than 1 μm thick, cannot provide enough storage capacity for the product water, resulting in flooding. Under dry conditions, it is believed that not all portions of the whiskers are utilized to catalyze the reaction due to poor proton transfer characteristics.

Besides the NSTF whisker catalyst described above, there are other uniformly dispersed (or dispersed with a desired pattern) catalytic nanostructured materials prepared on a substrate. For example, aligned carbon nanotubes, aligned carbon nanofibers, or nanoparticles, and the like could be grown on silicon or other substrates. Catalytic materials are then deposited onto the nanostructured materials. Electrocatalyst decals incorporating such materials are described, for example, in Hatanaka et al., PEFC Electrodes Based on Vertically Oriented Carbon Nanotubes, 210$^{th}$ ECS Meeting, Abstract #549 (2006); Sun et al., Ultrafine Platinum Nanoparticles Uniformly Dispersed on Arrayed $CN_x$ Nanotubes with High Electrochemical Activity, Chem. Mater. 2005, 17, 3749-3753; Warren et al., Ordered Mesoporous Materials from Metal Nanoparticle-Block Copolymer Self-Assembly, Science Vol. 320, 1748-1752 (27 Jun. 2008).

Therefore, there is a need for processing and constructing an electrode containing various types of nanostructured thin catalytic layers which can provide good performance over a wider range of operating conditions.

SUMMARY OF THE INVENTION

This invention provides a method of transferring nanostructured thin catalytic layers from a carrying substrate to a porous transfer substrate coated with an adhesive. The adhesive is then removed with appropriate solvents and the nanostructured thin catalytic layer can be further processed on the transfer substrate, if desired. Such further processing includes, but is not limited to, one or more of, removing any residual material on the nanostructured thin catalytic layer (e.g., non-crystallized perylene red used to form a nanostructured thin catalytic layer of whiskers, or catalysts used to make carbon nanotubes, and the like), incorporating additional layers/materials to construct an improved electrode containing the nanostructured thin catalytic layer (e.g., to increase the water storage capacity, or to increase conductivity). The porous transfer substrate with the transferred nanostructured thin catalytic layer can then be pressed against a PEM to transfer the reconstructed electrode containing the nanostructured thin catalytic layer from the transfer substrate to the PEM, followed by removal of the transfer substrate, to fabricate the membrane electrode assembly (MEA) or catalyst coated membrane (CCM) for use in fuel cell stack.

In one embodiment of the present invention, a method of transferring a nanostructured thin catalytic layer from a carrying substrate to a porous transfer substrate is provided. The method comprises providing an electrocatalyst decal comprising a carrying substrate having the nanostructured thin catalytic layer thereon, the nanostructured thin catalytic layer having a first surface and a second surface, the first surface of the nanostructured thin catalytic layer adjacent to the carrying substrate; providing a porous transfer substrate with an adjacent adhesive layer; adhering the second surface of the nanostructured thin catalytic layer adjacent to the adhesive layer to form a composite structure; removing the carrying substrate from the composite structure; and removing the adhesive layer from the composite structure to form an electrode decal comprising the porous transfer substrate and the nanostructured thin catalytic layer, wherein the second surface of the nanostructured thin catalytic layer is adjacent to the porous transfer substrate.

Optionally, the porous transfer substrate can have an intermediate layer first coated on the transfer layer before the adhesive is coated thereon. The intermediate layer is positioned between the transfer substrate and the adhesive layer, wherein the intermediate layer comprises one or more of adhesive, ionomer, carbon powder, carbon fiber, a catalyst, titanium dioxide, silica, nanofibers, nanotubes, or combinations thereof, wherein the intermediate layer is positioned between the porous transfer substrate and the nanostructured thin catalytic layer. When the intermediate layer includes adhesive, the method further comprises removing the adhesive in the intermediate layer from the composite to form a residual intermediate layer after the carrying substrate is removed.

Optionally, a solution can be coated onto the nanostructured thin catalytic layer after the carrying substrate and the adhesive layer have been removed, the solution forming an additional layer on the first surface of the nanostructured thin catalytic layer. The solution can include, but is not limited to, one or more of, an ionomer, carbon powder, carbon fibers, a catalyst, titanium dioxide, silica, nanofibers, nanotubes, or combinations thereof.

In a second embodiment of the present invention, a method of fabricating a catalyst coated membrane is provided. The method comprises providing an electrocatalyst decal comprising a carrying substrate having a nanostructured thin catalytic layer thereon, the nanostructured thin catalytic layer having a first surface and a second surface, the first surface of the nanostructured thin catalytic layer adjacent to the carrying substrate; providing a porous transfer substrate with an adjacent adhesive layer; adhering the second surface of the nanostructured thin catalytic layer adjacent to the adhesive layer to form a composite structure; removing the carrying substrate from the composite structure; and removing the adhesive layer from the composite structure to form an electrode decal comprising the porous transfer substrate and the nanostructured thin catalytic layer, wherein the second surface of the nanostructured thin catalytic layer is adjacent to the porous transfer substrate; providing a proton exchange membrane; transferring the nanostructured thin catalytic layer from the electrode decal to a first surface of the proton exchange membrane to form a catalyst coated membrane, the first surface of the nanostructured thin catalytic layer being adjacent to the first surface of the proton exchange membrane.

In a third embodiment of the present invention, an electrode decal is provided. The electrode decal comprises a porous transfer substrate; and a nanostructured thin catalytic layer having a first surface and a second surface, the nanostructured thin catalytic layer having been transferred from a carrying substrate, the first surface having been adjacent to the carrying substrate, and wherein the second surface of the nanostructured thin catalytic layer is adjacent to the porous transfer substrate.

In another embodiment, a catalyst coated proton exchange membrane is provided. The catalyst coated proton exchange membrane comprises a proton exchange membrane; a nanostructured thin catalytic layer having a first surface and a second surface, the nanostructured thin catalytic layer having been transferred from a carrying substrate to a transfer substrate, the first surface having been adjacent to the carrying substrate, the second surface having been adjacent to the transfer substrate, and wherein the first surface is adjacent to the proton exchange membrane.

Other features and advantages of the present invention will be apparent in light of the description of the invention embodied herein.

BRIEF DESCRIPTION OF THE DRAWINGS

The following detailed description of specific embodiments of the present invention can be best understood when read in conjunction with the following drawings, where like structure is indicated with like reference numerals, where various components of the drawings are not necessarily illustrated to scale, and in which.

DETAILED DESCRIPTION

Figure 1A:
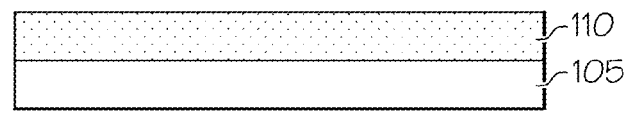
FIGS. 1A-E are an illustration of a general method of fabricating a nanostructured thin catalytic layer electrode decal according to one or more embodiments of the present invention.

This invention provides methods of transferring a nanostructured thin catalytic layer from the carrying substrate to a porous transfer substrate coated with an adhesive. The nanostructured thin catalytic layer can then be further processed on the porous transfer substrate. The adhesive can be removed, and any residual material (e.g., non-crystallized perylene red used to make whiskers, or catalysts used to make carbon nanotubes, and the like) can also be removed. Additional layers can be incorporated into the structure to increase the water storage capacity, if desired. Ionic conducting components can be incorporated into the nanostructured thin catalytic matrix, if desired. An electrode incorporating such a nanostructured thin catalytic layer provides good performance over a wider range of operating conditions, and takes advantage of its high catalytic activity and resistance to corrosion under certain fuel cell operating conditions The processes generally involve methods of transferring the nanostructured thin catalytic layer from the carrying substrate to another substrate. The carrying substrate can be the substrate the nanostructured thin catalytic layer was grown on or carried on. The transfer substrate that the nanostructured thin catalytic layer will be transferred to is pre-coated with a thin layer of temporary adhesive and/or a layer that contains particles (e.g., carbon powder, carbon fibers, a catalyst, titanium dioxide, silica, nanofibers, nanotubes, or combinations thereof), and/or ionomer, and the temporary adhesive. In doing so, the catalyst loading (mg/cm$^2$) on the transfer substrate is essentially the same as the carrying substrate where the nanostructured thin catalytic layer was formed.

An ionomer solution or an ink that contains particles and ionomer can be deposited on top of the nanostructured thin catalytic layer to form additional layers, if desired. An electrode with a nanostructured thin catalytic layer and additional layers and components can thus be prepared for later MEA or CCM fabrication.

Because of the transfer of the nanostructured thin catalytic layer from the carrying substrate to the transfer substrate, the nanostructured thin catalytic layer is inverted on the transfer substrate compared to the carrying substrate. In other words, after the transfer, the surface of the nanostructured thin catalytic layer that was exposed on the carrying substrate is adjacent to the transfer substrate, while the surface that was adjacent to the carrying substrate is exposed. The surface that was adjacent to the carrying substrate can contain residual materials that were used to form the nanostructured catalyst support elements (e.g., residual non-crystallized perylene red, or catalysts that were used to grow carbon nanofibers or carbon nanotubes, and the like), which can be cleaned through later treatment.

During the MEA or CCM fabrication progress, the nanostructured thin catalytic layer on the transfer substrate is hot pressed against a PEM and transferred to it. When the process is done and the transfer substrate is removed, the surface exposed on the original nanostructured thin catalyst layer carrying substrate will be again exposed to be the surface of the CCM. In general, the surface exposed on the original carrying substrate is more open compared to the surface against the carrying substrate. So the MEA prepared through the process described above would be more favorable for reactant gas transport and product water removal.

By adjacent, we mean next to, but not necessarily directly next to. There can be one or more intervening layers, as discussed below.

The residual layer is typically the left over materials used to form the nanostructured catalyst support elements. For example, when the nanostructured thin catalytic layer is a layer of whiskers made from perylene red, the residual layer is non-crystallized perylene red. For other nanostructured thin catalytic layers, the residual layer would be different. For example, it might be Fe or Ni catalysts used to grow carbon nanofibers or carbon nanotubes.

To simplify the discussion in the following illustrations, a nanostructured thin catalytic layer made from perylene red on a polyimide carrying substrate was chosen as a specific example. But in the case of other material sets, the carrying substrate would be different from the polyimide (e.g., silicon), and the nanostructured support elements could be different from the perylene red (e.g., carbon nanotubes).

FIGS. 1A-E illustrate the general steps involved in various embodiments of methods of reconstructing nanostructured thin catalytic layer electrode decals. FIG. 1A shows a transfer substrate 105 coated with an adhesive layer 110. The transfer substrate 105 can be any stiff or soft porous substrate. If the nanostructured thin catalytic layer is made on a smooth substrate, a stiffer substrate can be used as the transfer substrate. Stiff substrates can also be used if a thick layer of the temporary adhesive is coated on the transfer substrate, and the thickness of the adhesive layer is thicker than the roughness feature (e.g., corrugations) of the carrying substrate. For example, if the carrying substrate has a surface feature (e.g., corrugations) which is 6 microns between the highest and lowest points of the corrugated structure, then the thickness of the adhesive layer should be greater than 6 microns.

The transfer substrate can be porous or non-porous.

Porous transfer substrates are desirable because pores of the porous transfer substrate can then act as a drain for waste products used in further processing the nanostructured thin catalytic layer. It also allows vacuum to be applied to help hold the nanostructured thin catalytic layer in place after the adhesive is removed. Soft porous substrate can accommodate the surface roughness of the carrying substrate in case the nanostructured thin catalytic layers were not made on smooth substrates. Suitable types of porous substrates include, but not limited to, porous polyethylene (PE), porous polypropylene (PPE), porous Nylon, polyimide (PI), expanded polytetrafluoroethylene (ePTFE) and porous siloxane.

One suitable porous substrate is expanded polytetrafluoroethylene (ePTFE). ePTFE is soft which allows it to receive the nanostructured thin catalytic layers from both the top and the bottom of the corrugations of the electrocatalyst decal on which they were grown. ePTFE has another advantage when an adhesive dissolved in a hydrophilic solution is used. Because ePTFE is hydrophobic, only a thin film of the adhesive, such as polyvinyl alcohol (PVA), is formed on the surface of the ePTFE when the adhesive is coated from a PVA water solution, and the PVA will not fill the pores of the ePTFE substrate.

The adhesive layer 110 acts as a temporary glue which adheres the nanostructured thin catalytic layer and the porous substrate together, allowing the removal of the nanostructured thin catalytic layer from the carrying substrate. Any suitable adhesive can be used. Desirably, the adhesive is easily removable, and does not poison the catalyst. Water soluble adhesives are desirable because they can be easily removed with water. However, other solvents can be used to remove the adhesive, if desired. Suitable adhesives include, but are not limited to, polyvinyl alcohol (PVA), polyethylene oxide, polyacrylate, polyethylene vinyl acetate, and soluble cellulose. One suitable adhesive is a water soluble PVA, for example, a water soluble PVA having a molecular weight (MW) of about 10,000. Generally, the PVA layer loading is between about 3 $mg/cm^2$ and about 30 $mg/cm^2$, or about 5 $mg/cm^2$ to about 10 $mg/cm^2$.

The adhesive layer can optionally include one or more additional materials, including, but not limited to, ionomer, carbon powder, carbon fibers, a catalyst, titanium dioxide, silica, nanofibers, or nanotubes, if desired. If the adhesive layer contains one or more additional materials, there should be sufficient adhesive in the layer so that the nanostructured thin catalytic layer will adhere to it. If ionomer is in included, the amount of ionomer should be enough so that, combined with the adhesive, it will hold the nanostructured thin catalytic layer, but not so much that it blocks the pores of the porous transfer substrate. The adhesive layer desirably includes an adhesive, such as PVA, and ionomer.

The porous transfer substrate can be either hydrophobic or hydrophilic. Preferably, an adhesive soluble in an aqueous or hydrophilic solution is applied when the porous transfer substrate is hydrophobic, or vice versa. This allows a thin film of the adhesive to form only on the surface of the porous transfer substrate. In this way, the pores are not filled with the adhesive initially.

Figure 1B:
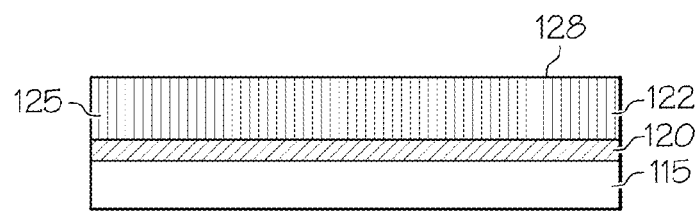

As shown in FIG. 1B, an electrocatalyst decal is provided. The electrocatalyst decal includes a carrying substrate 115 with nanostructured thin catalytic layer 125 on it. In some cases, there may be a residual layer 120 of the material used to form the nanostructured catalyst support elements between the carrying substrate 115 and the nanostructured thin catalytic layer 125. The nanostructured thin catalytic layer has a first surface 122 adjacent to the carrying substrate and an exposed second surface 128.

Suitable electrocatalyst decals comprising whiskers made from perylene red on a polyimide substrate known as NSTF catalyst layers are available from 3M. Other electrocatalyst decals with nanostructured thin catalytic layers could also be used. The nanostructured catalytic materials are either uniformly dispersed on the substrate or dispersed in a desired pattern. For example, aligned carbon nanotubes, aligned carbon nanofibers, or nanoparticles, and the like with uniformly dispersed catalyst could be used. Electrocatalyst decals incorporating such materials are described, for example, in Hatanaka et al., PEFC Electrodes Based on Vertically Oriented Carbon Nanotubes, $210^{th}$ ECS Meeting, Abstract #549 (2006); Sun et al., Ultrafine Platinum Nanoparticles Uniformly Dispersed on Arrayed $CN_x$ Nanotubes with High Electrochemical Activity, Chem. Mater. 2005, 17, 3749-3753; Warren et al., Ordered Mesoporous Materials from Metal Nanoparticle-Block Copolymer Self-Assembly, Science Vol. 320, 1748-1752 (27 Jun. 2008).

Figure 1C:
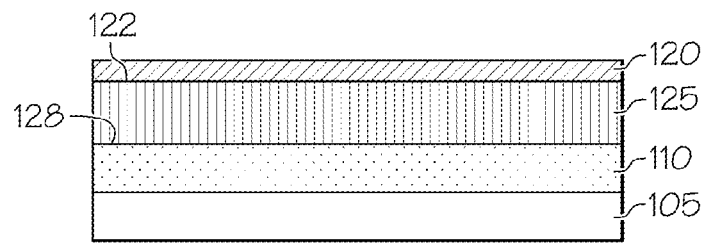

The nanostructured thin catalytic layer on the carrying substrate is inverted, and the second surface 128 of the nanostructured thin catalytic layer 125 is placed in contact with the adhesive layer 110 to form a composite structure. Suitable processes include, but are not limited to, static pressing with heat and pressure, or for continuous roll production, laminating, nip rolling, or calendering. The carrying substrate 115 is then removed (for example, by peeling off the carrying substrate). As shown in FIG. 1C, after the carrying substrate is removed, the residual layer 120 (if present) remains on the nanostructured catalytic layer 125.

Figure 1D:
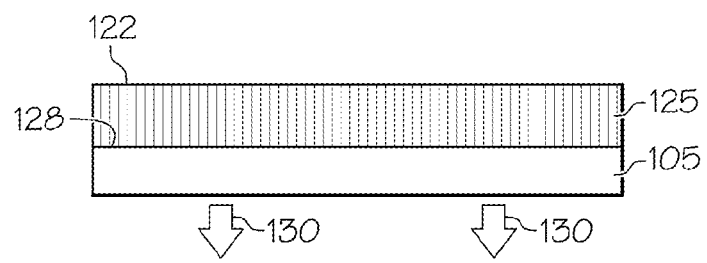

The adhesive layer 110 is then removed by a suitable process, as shown in FIG. 1D. One example of a suitable process involves rinsing the composite structure with a solvent to dissolve the adhesive. The solvent desirably wets the surface of the porous transfer substrate 105. Suitable solvents include, but are not limited to, water/alcohol mixtures, such as for example, a water/isopropanol (IPA) mixture when an ePTFE substrate is used. The alcohol in the water/alcohol mixture helps wet the hydrophobic ePTFE substrate, and the pores of the porous substrate act as a drain for the solvent.

The nanostructured thin catalytic layer 125 can be further treated to remove the residual layer 120 (if necessary), exposing the first surface 122 of the nanostructured thin catalytic layer 125. The residual layer 120 can be removed by any suitable process. One example of a suitable process is rinsing the nanostructured thin catalytic layer with a solvent to dissolve the residual layer. If the nanostructured thin catalytic layer comprises whiskers made from perylene red, suitable solvents for perylene red, include, but are not limited to, mixtures of water, acetone, n-propanol (NPA), or 1-methyl-2-pyrolidone (NMP). Water/NPA mixtures can dissolve small amounts of perylene red (low solubility). NMP appears to be very effective to dissolve perylene red, but it has a high boiling point and thus further solvent rinsing is required to fully remove it. Consequently, mixtures of the above mentioned solvents are preferred to perform the cleaning process. Again, the pores of the porous substrate act as a drain for the solvent and dissolved residual materials. If Fe or Ni catalysts are used to grow carbon nanotubes or carbon nanofibers, nitric acid, sulfuric acid, and other acids could be used to dissolve the residual metals. Alcohol could be added to the acidic solution to help wet the ePTFE substrate, if desired.

The adhesive layer 110 and residual layer 120 can be removed simultaneously by applying solvents for both layers at the same time. Alternatively, one layer can be removed after the other. In this situation, the adhesive layer 110 would preferably be removed first in order to clear up the path to the pores in the porous transfer substrate.

Figure 1E:
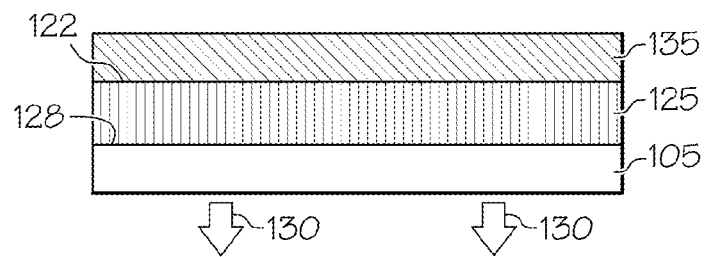

Optionally, an additional layer of material 135 can be added as shown in FIG. 1E, if desired. The additional layer 135 can include one or more materials which can be used to improve the performance of the reconstructed nanostructured thin catalytic layer electrode. For example, an ionomer can be added to increase the proton conduction of the whisker catalysts under dry conditions. A hydrophobic component, such as PTFE particles, can be included to improve wet performance. Carbon (powder, fibers, or both), or catalyst can be included to increase the overall electrode thickness and thus improve the product water storage capability. Titanium dioxide and/or silica, which are hydrophilic and could be used to retain product water under dry conditions, can also be included. Nanofibers and/or nanotubes, which can be used as structural materials to incorporate into the whisker matrix, can also be used.

When an ionomer solution is coated onto the nanostructured thin catalytic layer, the concentration of the ionomer solution typically varies from about 0.1 wt % to about 5 wt %, or about 0.1 wt % to about 0.5 wt %. When an ink containing other particles is coated onto the nanostructured thin catalytic layer, the composition and solvent can be adjusted by desire. The pores of the porous layer act as a drain for the solvents and solutes. In the case when an ionomer solution or an ink containing ionomer is used, the ionomer will coat the nanostructured catalyst when it drains across the nanostructured thin catalytic layer and through the porous substrate and thus leave thin ionomer films on the catalyst surfaces. However, it would not generate a continuous film between the whiskers 125 and the porous carrying substrate 105. The presence of a continuous film on the interface 128 would hinder the reactant gas transport and product water removal when the electrode is made into CCM since the surface 128 would become the exposed surface of the electrode on the proton exchange membrane, which will be discussed in later sections.

As shown in FIGS. 1D and 1E, a vacuum 130 can be applied during the removal of the adhesive layer, and/or the removal of the residual layer, and/or the deposition of the additional layer, if desired.

This process transfers the nanostructured thin catalytic layers from the carrying substrate they are grown on or carried on to another transfer substrate. In doing so, the nanostructured thin catalytic layer is inverted so that the surface that was adjacent to the carrying substrate is exposed. This allows that surface to be cleaned, and the residual material (if present) to be removed, which can help improve electrode performance and durability.

The transfer process allows additional layers to be deposited on the cleaned surface of the nanostructured thin catalytic layer after transfer. Additional layers can also be pre-coated on the porous transfer substrate before the adhesive layer is coated on. The pre-coated layer can contain particles (e.g., carbon powder, carbon fibers, a catalyst, titanium dioxide, silica, nanofibers, nanotubes, or combinations thereof), and/or ionomer, and the temporary adhesive as well. As a result, the structures of the electrodes formed and the catalyst coated membranes made using them can be adjusted by selection of the location, types, composition, and thicknesses of these additional layers.

The reconstructed electrodes on the porous transfer substrate formed by the above process can then be used to form a catalyst coated membrane. The reconstructed electrode is adhered to one or both surfaces of a PEM, and the porous transfer substrate is then removed to form the catalyst coated membrane. Typically, pressure and optionally heat are applied to adhere the reconstructed electrodes containing the nanostructured thin catalytic layer to the PEM, allowing transfer of the reconstructed elelctrode from the transfer substrate to the PEM. Processes suitable for adhering the reconstructed electrodes containing the nanostructured thin catalytic layer to the PEM include, but are not limited to, static pressing with heat and pressure, or for continuous roll production, laminating, nip rolling, or calendering.

Generally, a pressure of between about 90 and about 900 MPa can be used to adhere the reconstructed electrodes containing the nanostructured thin catalytic layers to the PEM. The press temperature should be high enough to attach the reconstructed electrodes containing the nanostructured thin catalytic layers to the PEM, but below the melting temperature of the PEM. For example, the press temperature is generally between about 80° and about 300° C. The pressing time is typically greater than about 1 second; for example, a pressing time of about one minute is suitable for many situations.

The catalyst coated membrane can be used in a membrane electrode assembly for a fuel cell, or other electrochemical energy conversion devices, such as electrolyzers.

Example 1

FIGS. 2A-D show one embodiment of a method of transferring a 3M NSTF catalyst layer made from perylene red from a polyimide carrying substrate to an ePTFE transfer substrate.

Figure 2A:
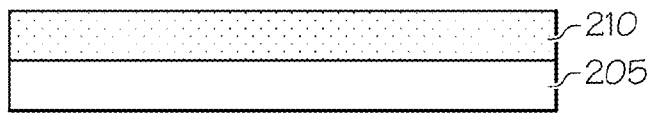
FIGS. 2A-D are an illustration of one embodiment of the method of fabricating a nanostructured thin catalytic layer electrode decal according to the present invention.

FIG. 2A shows an ePTFE porous substrate 205 coated with a water soluble PVA (molecular weight around 10,000) adhesive layer 210 through a 5 wt % aqueous solution. The PVA loading is about 6 mg/cm$^2$ after drying.

Figure 2B:
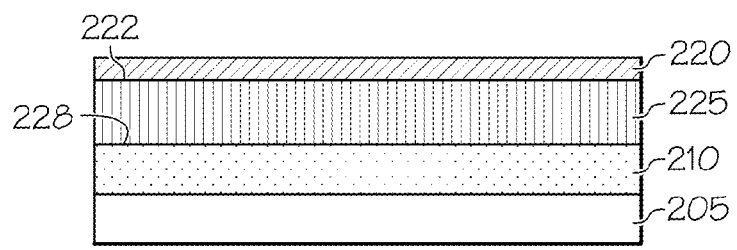

A 3M NSTF catalyst layer supported on a carrying substrate was provided. It included a polyimide carrying substrate, and a nanostructured thin catalytic layer of whiskers made from perylene red 225. There was a residual layer of perylene red 220 on the interface between the whiskers and the polyimide carrying substrate. Using a hot press (105° C., 3.5 MPa, 4 minutes) process, the second surface 228 of the layer of whiskers 225 was pressed against the PVA adhesive layer 210 on the ePTFE porous transfer substrate 205. The carrying substrate was then peeled off, leaving whisker layer 225 on the porous transfer substrate 205 and the residual layer of perylene red 220 exposed, as shown in FIG. 2B.

Figure 2C:
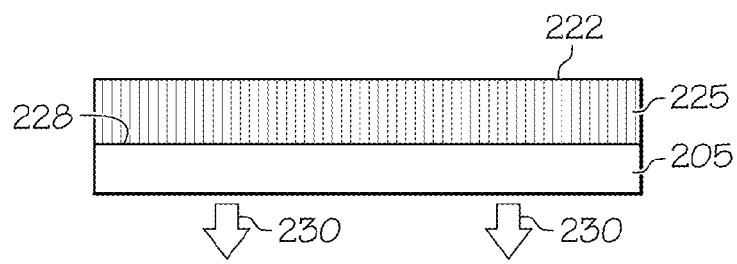

As shown in FIG. 2C, the PVA adhesive layer 210 was then removed by coating a water/IPA (1:1 weight ratio) mixture solution multiple times until the solvent drained freely through the ePTFE substrate. An EtOH/NPA (1:1) mixture solution was then coated on top of the whiskers 225 multiple times to remove the residual layer of perylene red 220, exposing first surface 222.

Figure 2D:
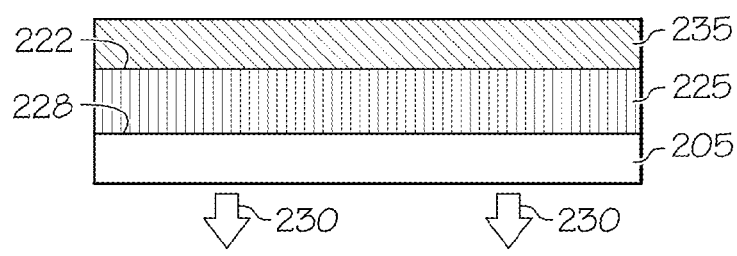
Figure 3A:
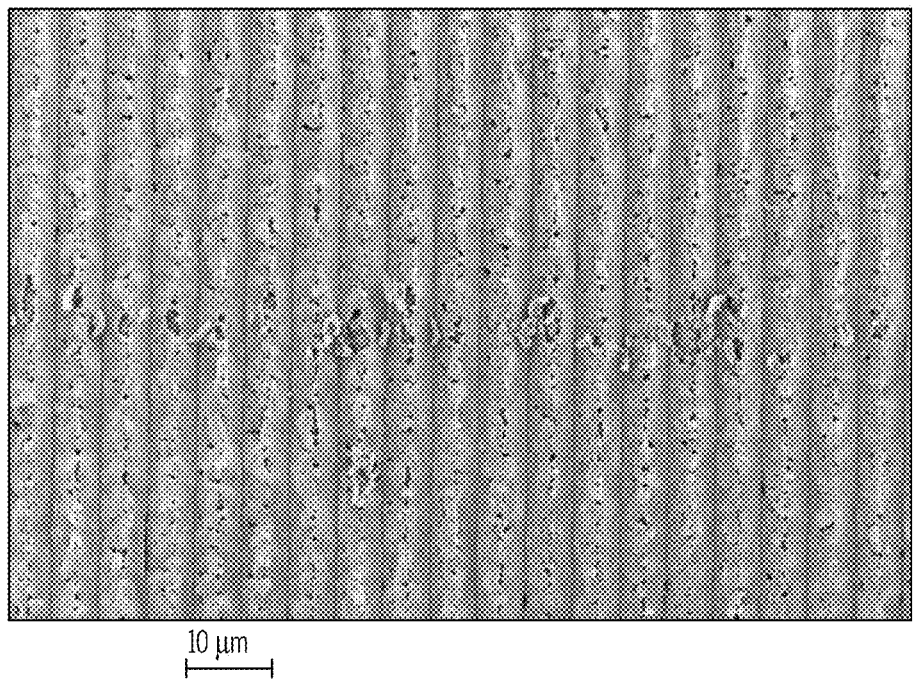
FIGS. 3A-D show top down SEM images of a nanostructured thin catalytic layer on the porous transfer substrate at the stage of 2C made using the method of FIG. 2 at different magnifications.
Figure 3B:
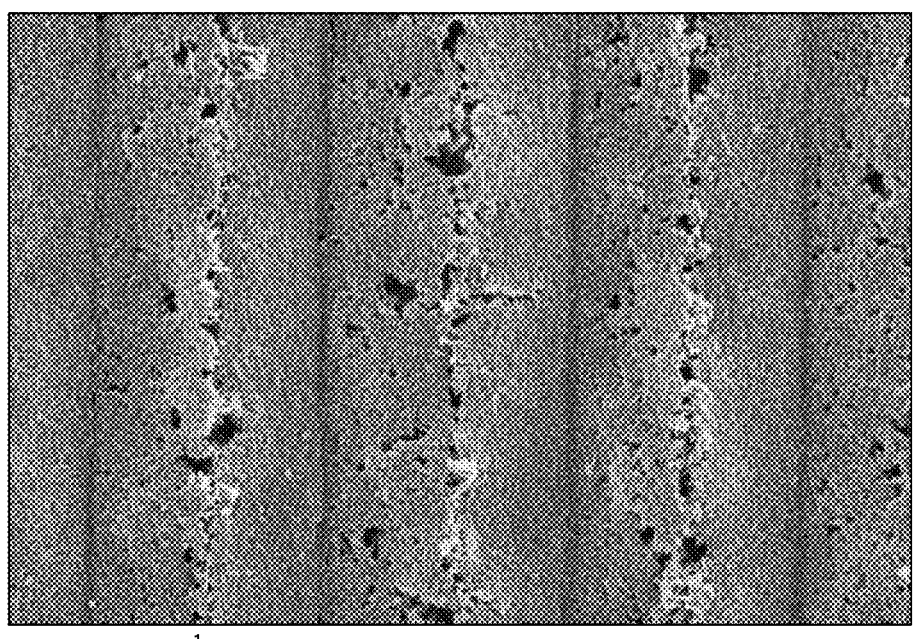
Figure 3C:
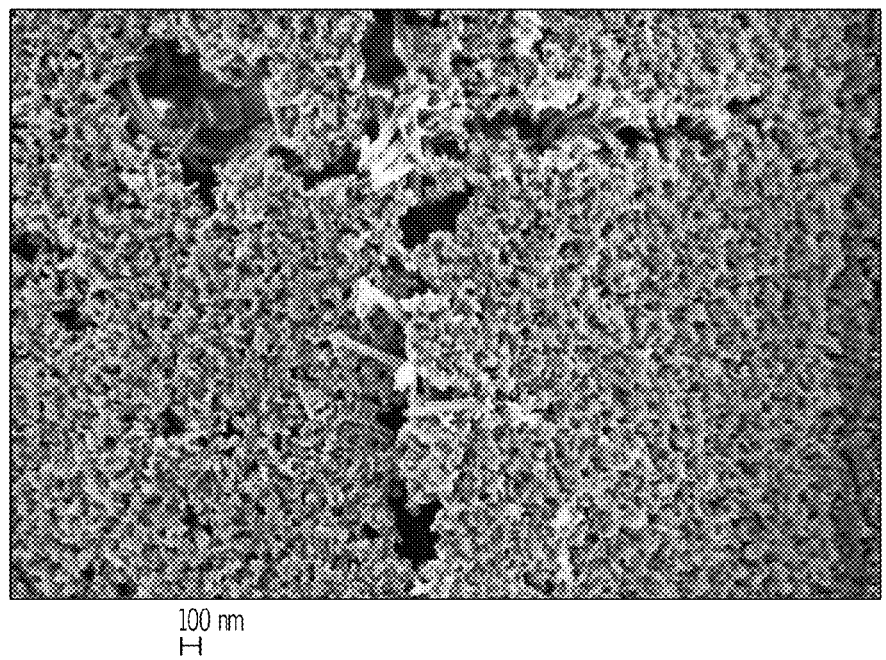
Figure 3D:
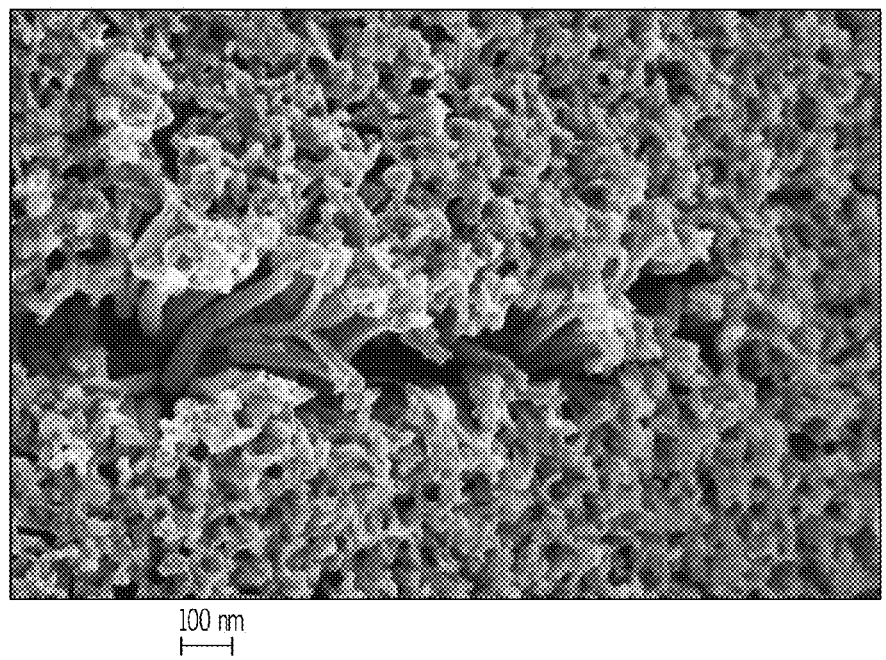

A diluted DuPont DE2020 ionomer solution (0.2 wt % in NPA:EtOH:H$_2$O=1:2:2 solution) was then coated on top of the whiskers to incorporate the ionomer into the whisker matrix. The ionomer solution drains across the whisker layer and thus coats a thin ionomer film on the surfaces of the whiskers. Depending on the ionomer concentration and the amount of the ionomer solution coated, a layer of ionomer film could be built up on top of the exposed surface 222 of the whiskers as well, layer 235, as shown in FIG. 2D. Excessive ionomer drained through the pores of the ePTFE substrate, and thus no continuous ionomer film would be formed on the interface 228 between the whiskers 225 and the porous carrying substrate 205.

Vacuum 230 was applied during the removal of the adhesive layer, and/or the removal of the residual materials from the formation of the nanostructured elements, and/or the deposition of the ionomer solution.

Figure 4A:
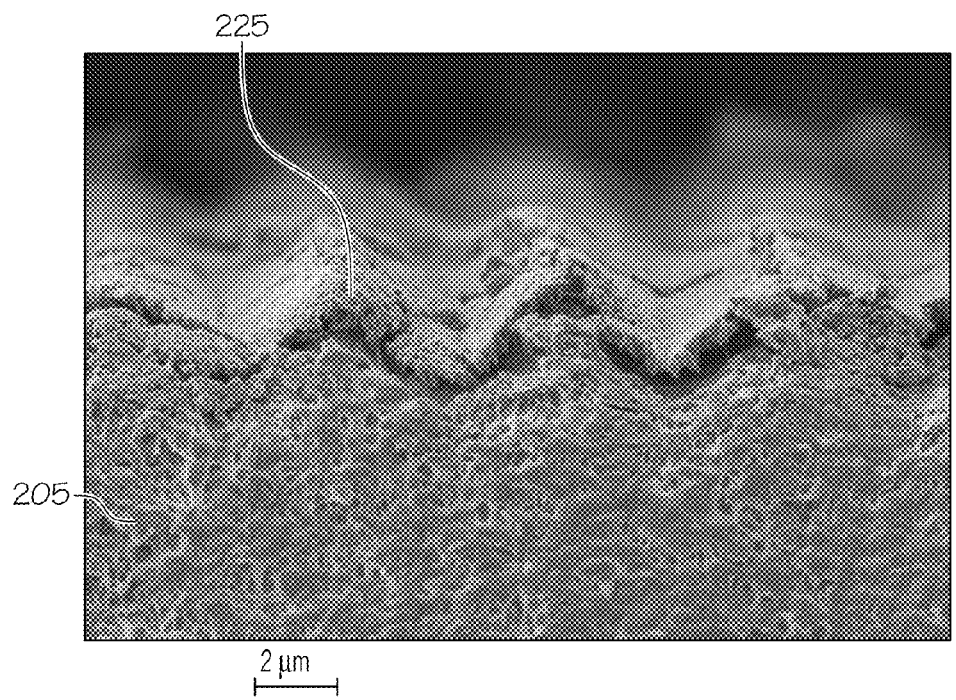
FIGS. 4A-B show SEM images of the cross-section of the nanostructured thin catalytic layer on the porous transfer substrate of FIG. 3.
Figure 4B:
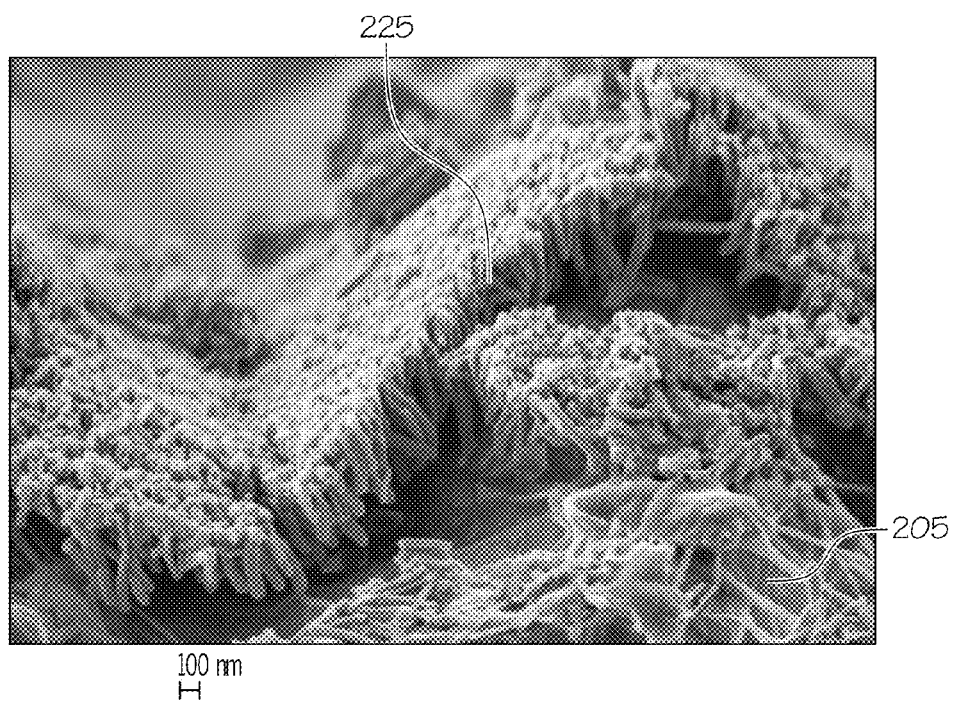

FIGS. 3A-D show top down SEM images of a set of whiskers transferred to the ePTFE substrate at the stage of 2C according to Example 1 in FIG. 2 at successively higher magnifications. These figures show the clean and nearly complete transfer of the whiskers to the ePTFE substrate with the whisker backing layer exposed. FIGS. 4A-B show SEM images of the cross-section of the whiskers on the ePTFE substrate of FIG. 3. The ePTFE porous substrate 205 with the layer of whiskers 225 and the exposed first surface can be seen. The SEM images of FIGS. 3-4 were taken after the PVA adhesive and perylene red residual layer were removed and before the ionomer layer was deposited. The whiskers stay intact on the ePTFE substrate after the removal of the temporary PVA adhesive.

Figure 5A:
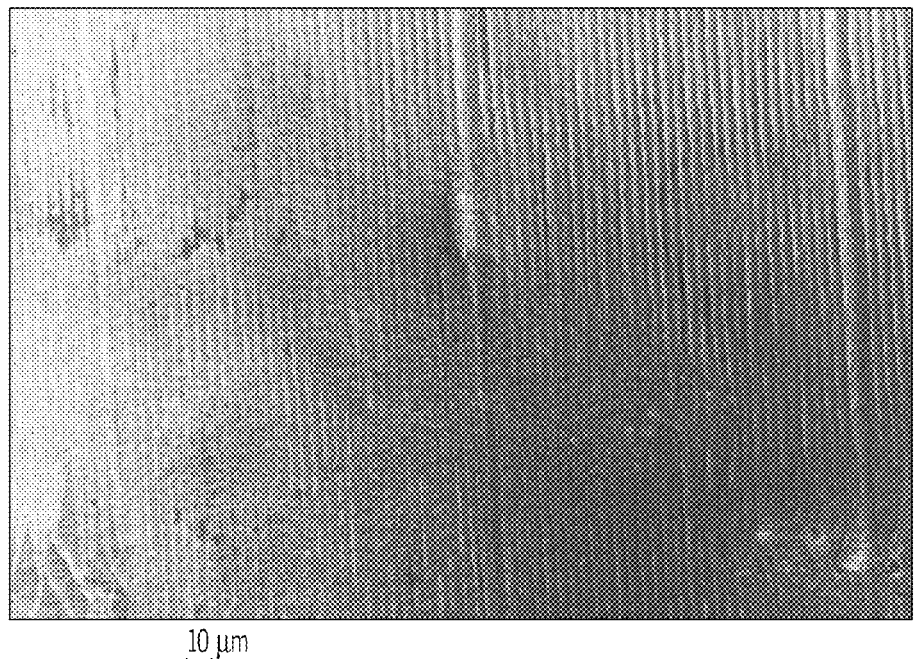
FIGS. 5A-B show top down SEM images of a nanostructured thin catalytic layer on the porous transfer substrate at the stage of 2D made using the method of FIG. 2.
Figure 5B:
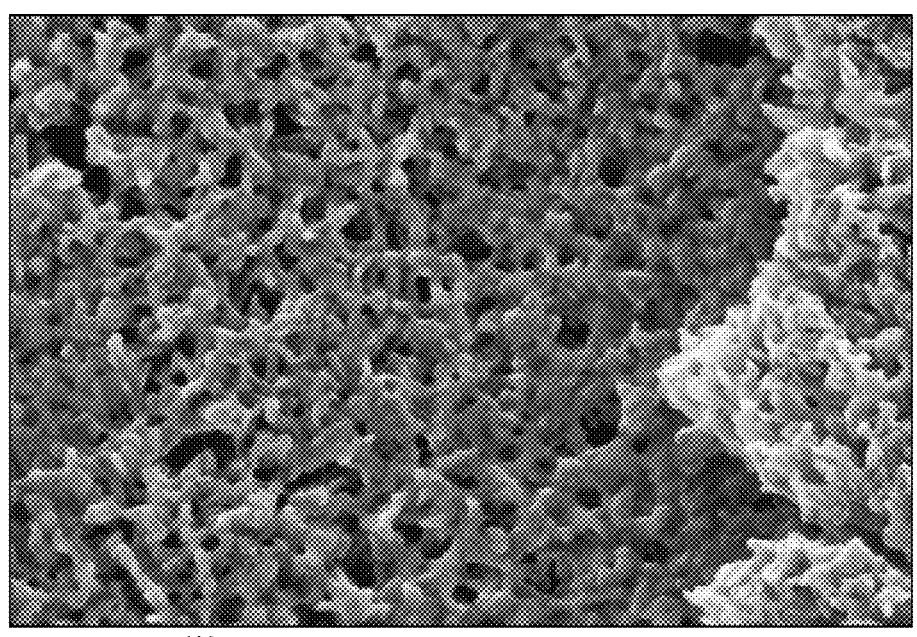
Figure 6A:
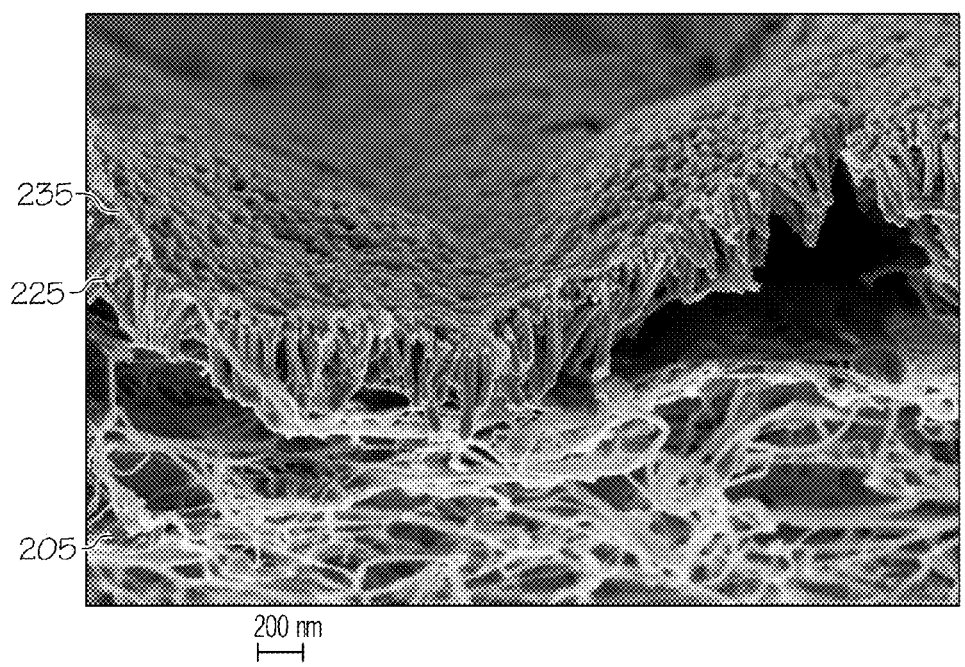
FIGS. 6A-B show SEM images of the cross-section of the nanostructured thin catalytic layer on the porous transfer substrate of FIG. 5.
Figure 6B:
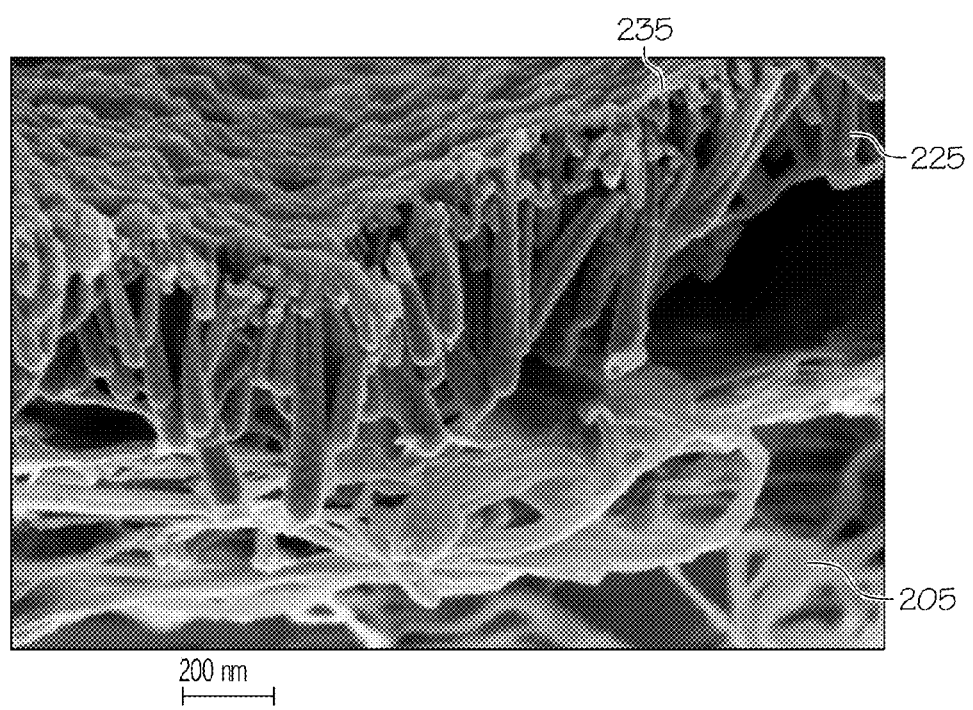

FIGS. 5A-B show top down SEM images with different magnifications of the whiskers catalytic layer transferred to the ePTFE substrate. Additional ionomer is then added to the whisker matrix at the stage of 2D according to Example 1 in FIG. 2. They show the whiskers stay intact on the ePTFE substrate through the ionomer coating process. FIGS. 6A-B show SEM images of the cross section of the whiskers on the ePTFE substrate of FIG. 5, showing the ePTFE substrate 205 with the thin layer of ionomer 235 on the surface of the nanostructured whisker catalyst layer 225.

In FIGS. 5 and 6, a controlled amount of ionomer was coated on the top of the whiskers using ionomer solution with a water/alcohol solvent.

An excess amount of ionomer can also be used by increasing the ionomer concentration or through multiple coating passes, and a thick ionomer film would be formed on top the whiskers layer 225. The excessive thick ionomer film will help to improve the interface between the whiskers and the PEM during the final CCM fabrication process, especially when the nanostructured thin catalytic layer carries over the corrugated structure from its carrying substrate. The thick ionomer film will be against the PEM during the hot press process to fabricate the CCM, and it will become part of the membrane once it is made into MEAs, and thus it would not hurt the fuel cell performance.

Example 2

Another embodiment of a method of transferring a 3M NSTF catalyst layer made from perylene red on a polyimide carrying substrate to an ePTFE transfer substrate is shown in FIGS. 7A-D.

Figure 7A:
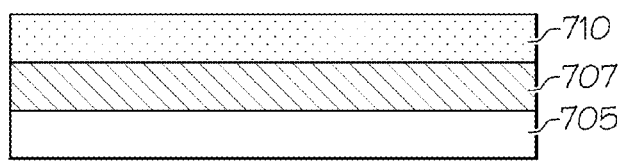
FIGS. 7A-D are an illustration of another embodiment of the method of fabricating an electrode decal containing a nanostructured thin catalytic layer according to the present invention.

FIG. 7A shows an ePTFE porous substrate 705 is pre-coated with an intermediate layer 707. Intermediate layer 707 can include adhesive, or ionomer, or both. It can also include the same additional materials described above with respect to additional layer 135. If ionomer is used without adhesive, then additional materials are preferably included. In this case, the amount of ionomer should be enough so that it will hold the additional materials together, but not so much that it blocks the pores of the porous transfer substrate. Desirably, the layer includes a removable adhesive, with or without ionomer, and one or more additional materials.

A PVA adhesive layer 710 is coated on top of the layer 707. Intermediate layer 707 can be made using the same adhesive as in adhesive layer 710 or a different adhesive. If the same adhesive is used in adhesive layer 710 and intermediate layer 707 (or if a solvent is used which can remove both adhesives), the adhesive in intermediate layer 707 will be removed at the same time as adhesive layer 710, leaving residual intermediate layer 709. If a different adhesive it used, another solvent can be used to remove the adhesive in intermediate layer 707.

If adhesive layer 710 contains one or more additional materials, the additional materials can be same as those in intermediate layer 707, or they can be different, if desired.

In this case, the adhesive layer 710 is only composed of PVA.

In this example, intermediate layer 707 included a mixture of PVA and Vulcan XC-72 carbon from Cabot Corporation. The weight ratio between PVA and Vulcan carbon is 1:1. The solvent used in this ink is NPA:EtOH:$H_2O$=1:2:2. If desired, ionomer could also be added into this ink to adjust the final ionomer content in this layer for the final electrode.

Figure 7B:
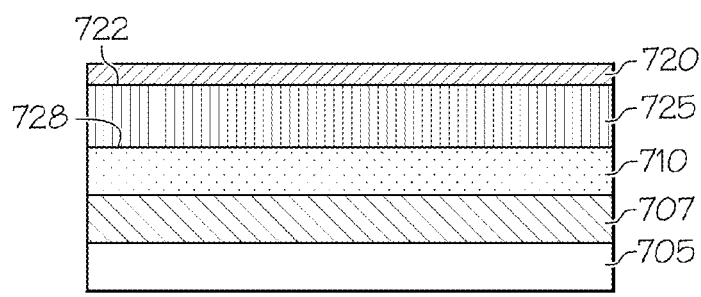

A nanostructured thin catalytic layer on a carrying substrate including a polyimide substrate, a residual layer of perylene red 720, and whiskers 725 was placed in contact with the PVA adhesive layer 710 to form a composite structure. The polyimide substrate was removed after hot press. The remaining structure is shown in FIG. 7B.

The PVA adhesive layer 710 and the PVA adhesive in intermediate layer 707 was then removed with a water/IPA mixture, leaving residual intermediate layer 709. The whiskers could mix into the intermediate layer 709 after the temporary PVA adhesive is removed.

Figure 7C:
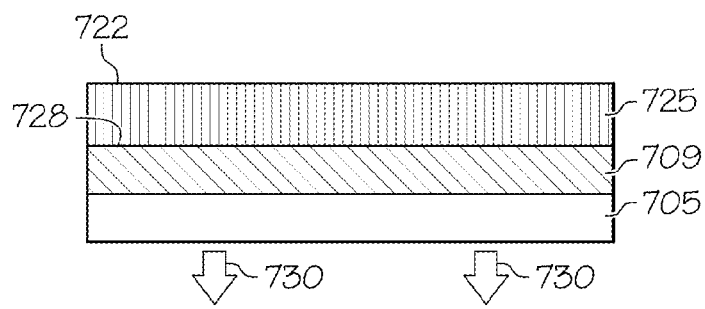

The residual layer of perylene red 720 was removed by rinsing the whiskers 725 with an EtOH/NPA mixture, exposing first surface 722, as shown in FIG. 7C.

Figure 7D:
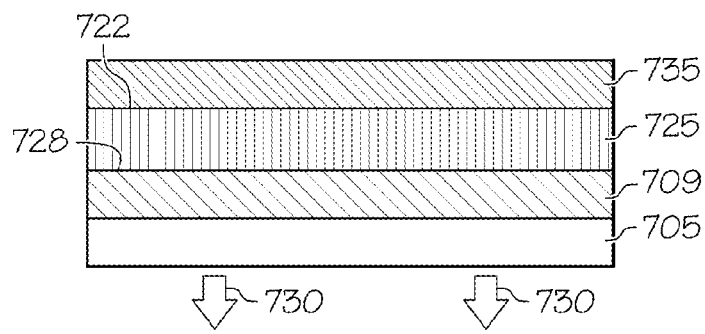

An ionomer solution diluted from DuPont Nafion DE2020, 735 was added as shown in FIG. 7D by coating the diluted ionomer solution (0.5 wt % with IPA:$H_2O$=1:1 solution) onto the whiskers. The ionomer solution will drain through the intermediate layer 709 and the whisker layer 725 and thus coat a thin ionomer layer film on the particles in the intermediate layer 709 and on the surface of the whiskers. In this case, excessive ionomer is used to build up a thick ionomer layer 735 on top of the whisker layer 725.

Vacuum 730 was applied during the removal of the adhesive layer, and/or the removal of the residual material from the whisker formation, and/or the deposition of the ionomer layer.

Figure 8A:
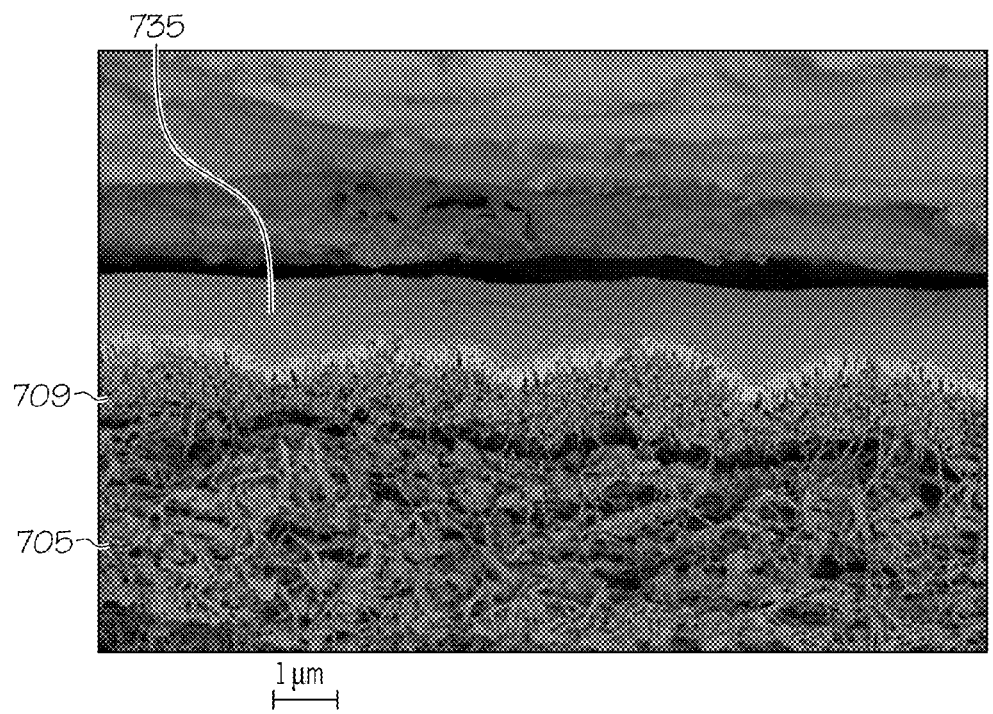
FIGS. 8A-B show SEM images of the cross-section of one embodiment of a nanostructured thin catalytic layer on the porous transfer substrate at the stage of 7D made using the method of FIG. 7.
Figure 8B:
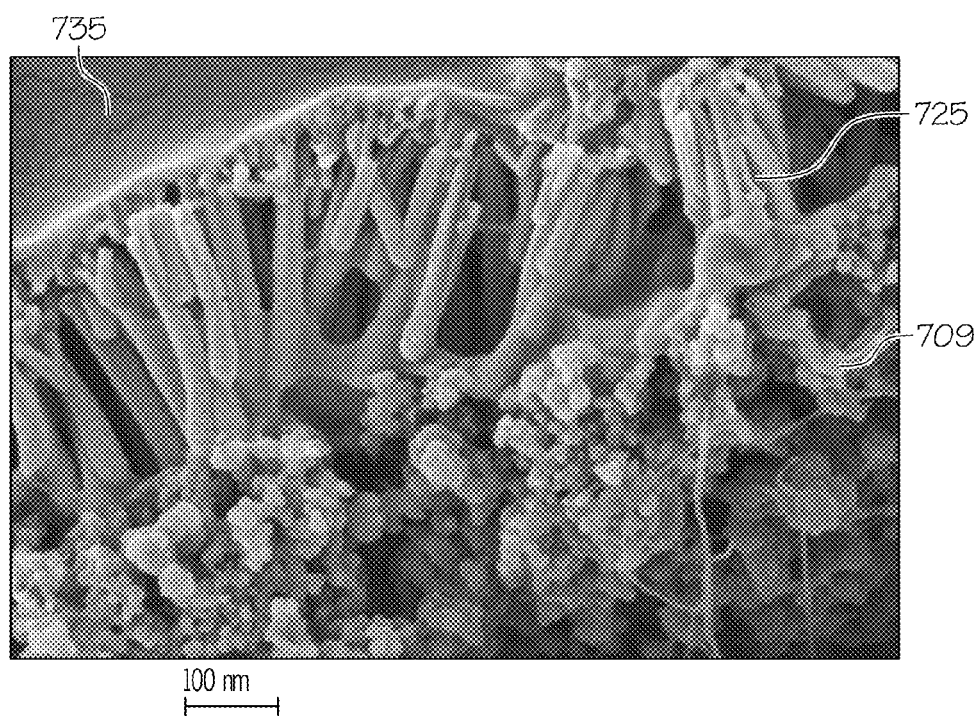
Figure 9A:
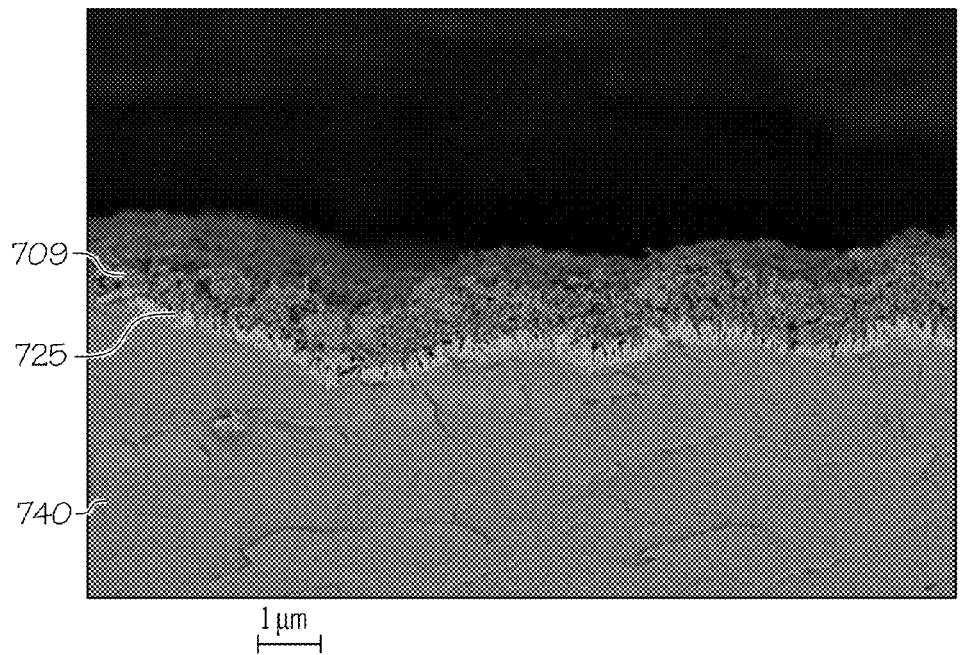
FIGS. 9A-B show SEM images of the cross-section of one embodiment of a catalyst coated membrane made with the reconstructed nanostructured thin catalytic layer electrode decal of FIG. 8.
Figure 9B:
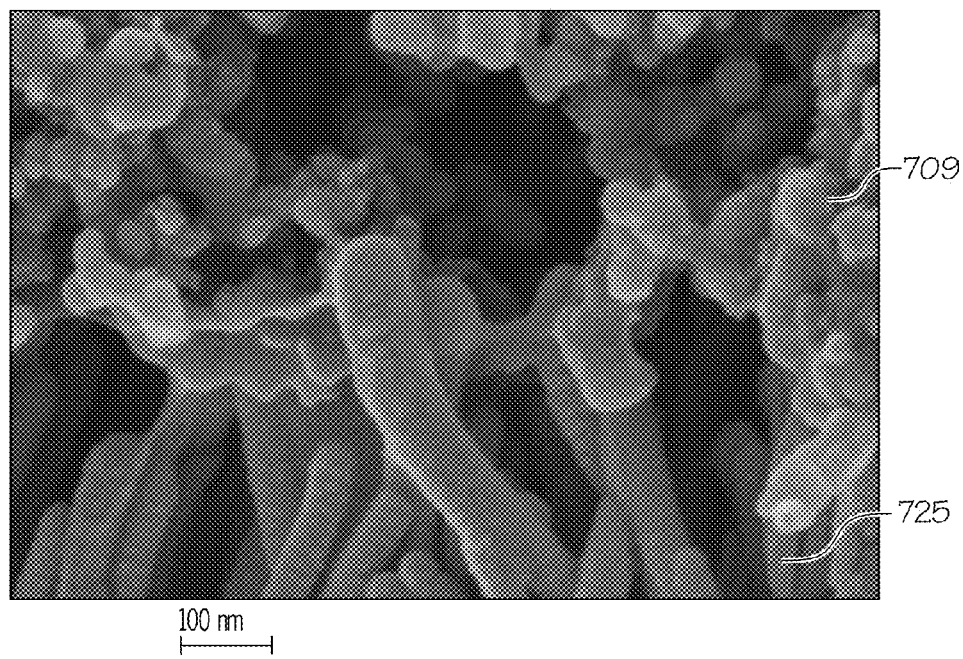

FIGS. 8A-B are SEM images of the cross-section of the reconstructed electrode made according to Example 2. The ePTFE substrate 705 has the layer of Vulcan carbon 709 sandwiched between the layer of whiskers 725 and ePTFE substrate 705. The excessive ionomer built up on top the whisker layer can be clearly seen 735. FIGS. 9A-B are SEM images of the cross-section of an CCM made through hot pressing (145° C., 1.4 MPa, 4 minutes) the electrode decal shown in FIG. 8 onto a DuPont Nafion® NRE211 membrane. The whiskers have been attached to the PEM 740 and the ePTFE porous substrate 705 has been removed. As it can be seen, the excessive ionomer film 735 formed on top of the whisker layer is not visible any more. It has become part of the PEM 740 and the whiskers 725 are intimately against the PEM 740. The carbon layer 709 is now exposed and becomes the surface of the catalyst coated membrane.

Example 3

Figure 10A:
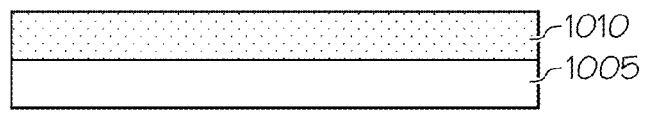
FIGS. 10A-D are an illustration of another embodiment of the method of fabricating an electrode decal containing a nanostructured thin catalytic layer according the present invention.
Figure 10B:
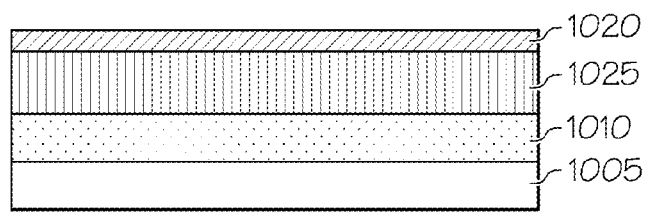
Figure 10C:
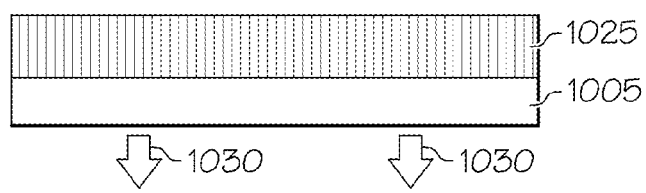

Another embodiment of a method of transferring a NSTF catalyst layer from a polyimide carrying substrate to an ePTFE transfer substrate is shown in FIGS. 10A-D. FIG. 10A shows an ePTFE porous substrate 1005 coated with a PVA adhesive layer 1010.

The nanostructured thin catalytic layer including a polyimide carrying substrate, a perylene red residual layer 1020, and whiskers 1025, was contacted with the PVA adhesive layer 1010 using a hot press process (105° C., 3.5 MPa, and 4 minutes) to form a composite structure. The polyimide substrate was peeled off after hot pressing, leaving the structure shown in FIG. 10B.

The PVA adhesive layer 1010 was then removed using a water/IPA solution (1:1 weight ratio), and the perylene red residual layer 1020 was also removed using an EtOH/NPA mixture.

Figure 10D:
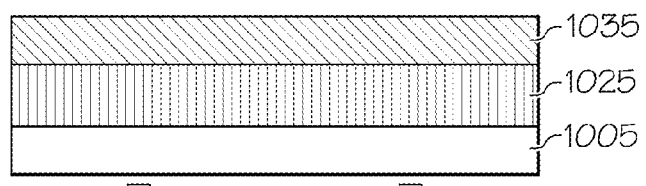

An additional layer 1035 containing DuPont Nafion® DE2020 ionomer and Vulcan XC-72 carbon from Cabot Corporation or Pt/Vulcan TEC10V50E catalyst from Tanaka Kikinzoku Kogyo K. K., was added as shown in FIG. 10D by coating an ink with the ionomer to Vulcan carbon weight ratio at 1.5 in a solvent of $H_2O$:EtOH:NPA=2:2:1 onto the whiskers layer 1025.

Vacuum 1030 was applied during the removal of the adhesive layer, and/or the removal of the residual perylene red, and/or the deposition of the ionomer layer.

Figure 11A:
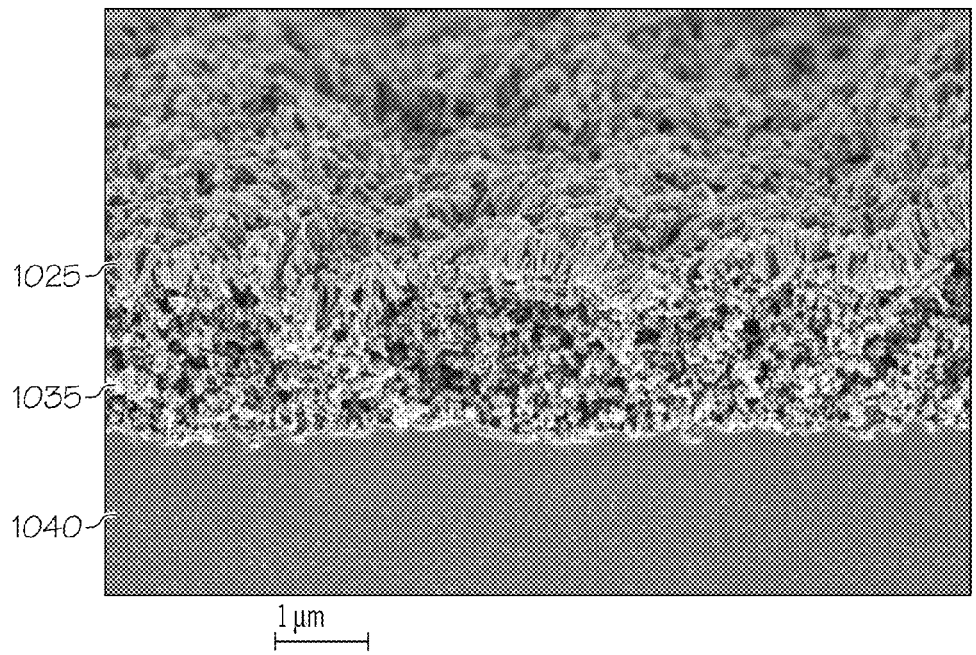
FIGS. 11A-B are SEM images of the cross-sections of embodiments of catalyst coated membrane made with reconstructed nanostructured thin catalytic layer electrode decals made using the method of FIG. 10.
Figure 11B:
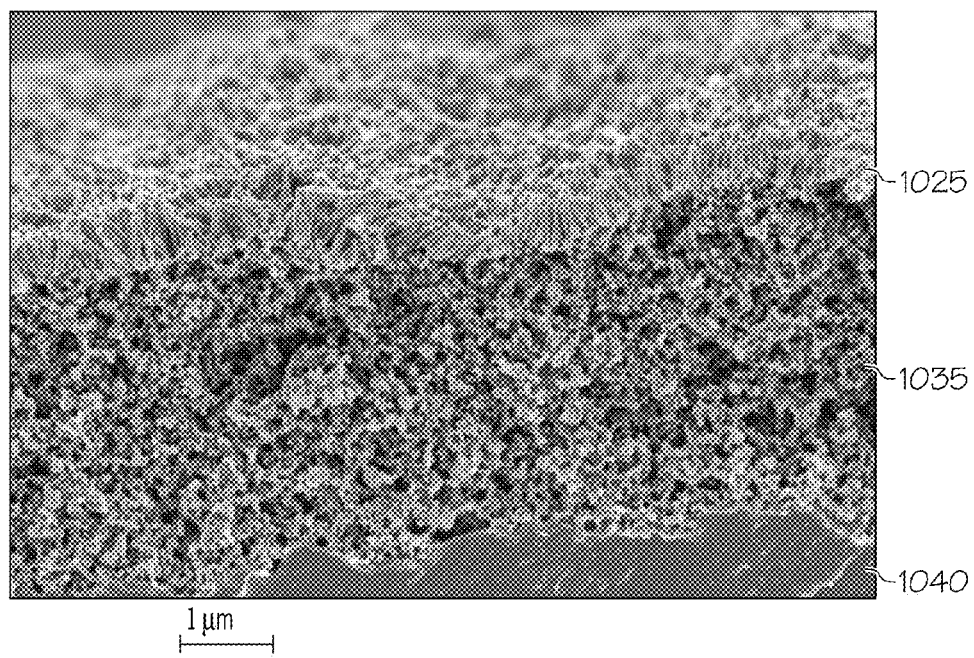
Figure 12A:
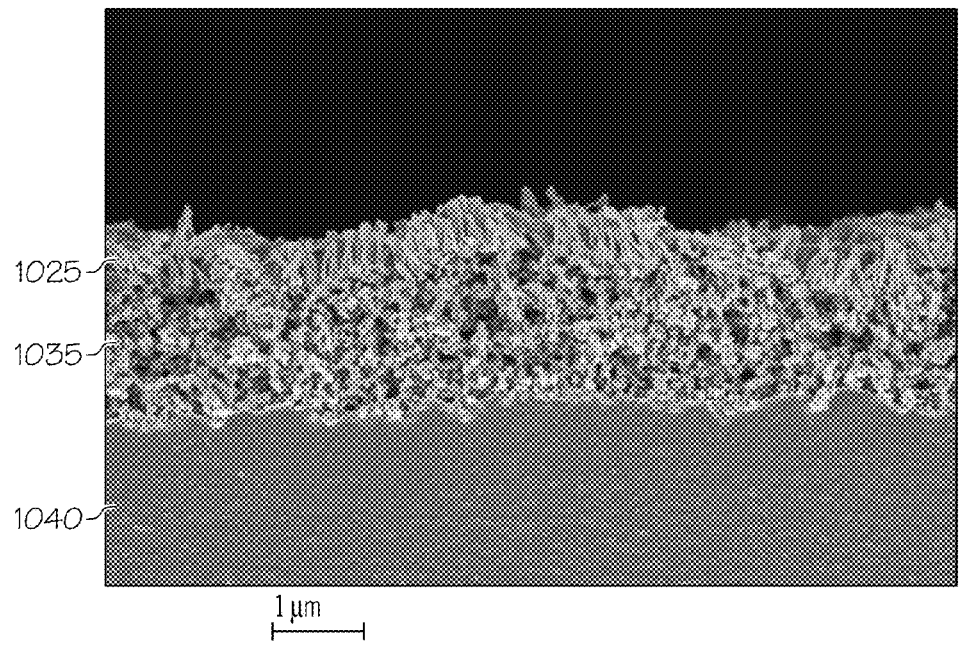
FIGS. 12A-B are SEM images of the cross-sections of embodiments of another catalyst coated membrane made with reconstructed nanostructured thin catalytic layer electrode decals made using the method of FIG. 10.
Figure 12B:
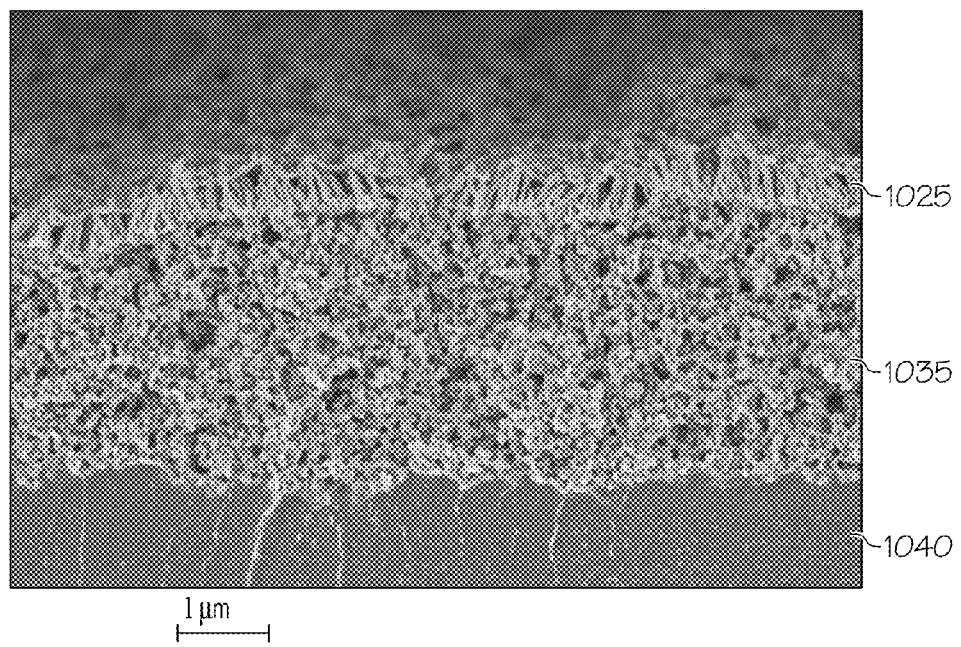

FIGS. 11A-B are SEM images of the cross-section of a catalyst coated membrane made using the electrode decal made according to Example 3 with various carbon layer thicknesses. The electrode has a layer of Vulcan XC-72 carbon mixed with Nafion® DE2020 ionomer 1035 between PEM 1040 and the whiskers 1025. FIGS. 12A-B are SEM images of the cross-section of a catalyst coated membrane made using the electrode made according to Example 3 with various catalyst layer thicknesses. The electrode has a layer of Pt/Vulcan catalyst mixed with Nafion® DE2020 ionomer 1035 between PEM 1040 and the whiskers 1025. In both cases, the thickness of the carbon or Pt catalyst layer 1035 is controlled by depositing different amount of the carbon or catalyst ink onto the top of the whisker layer 1025.

When the ink of carbon or catalyst mixed with ionomer is coated onto the whisker layer 1025, the solution will drain through the whisker layer 1025 and thus also coat a thin ionomer layer film on the surface of the whiskers.

Example 4

Figure 13A:
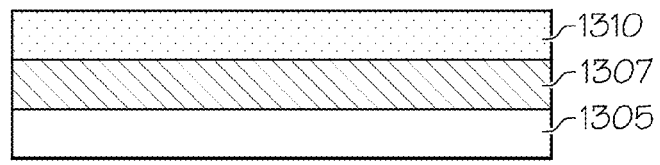
FIGS. 13A-D are an illustration of another embodiment of the method of fabricating an electrode decal containing a nanostructured thin catalytic layer according to the present invention.
Figure 13B:
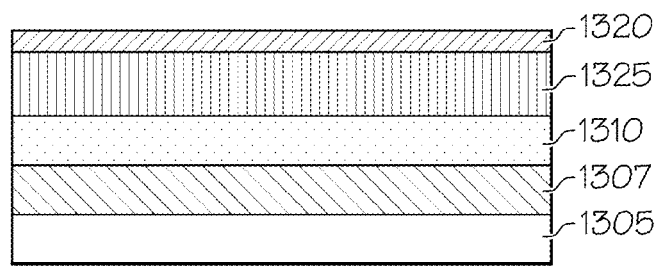
Figure 13C:
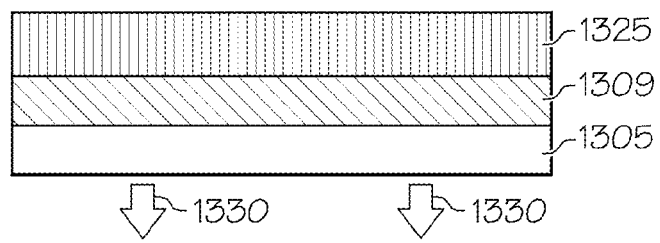
Figure 13D:
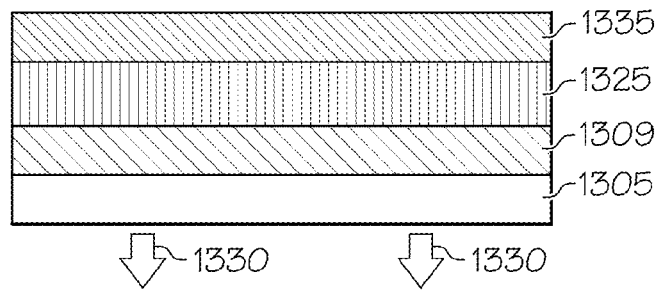

Another embodiment of a method of transferring a nanostructured thin catalytic layer from a polyimide carrying substrate to an ePTFE transfer substrate is shown in FIGS. 13A-D. FIG. 13A shows an ePTFE porous substrate 1305 first coated with a layer 1307 before coating a PVA adhesive layer 1310 on top of 1307. Layer 1307 is a mixture of PVA adhesive and desirable particles, such as Vulcan XC-72 carbon available from Cabot Corporation or Pt/Vulcan TEC10V50E catalyst available from Tanaka Kikinzoku Kogyo K. K.

The nanostructured thin catalytic layer including a polyimide substrate, a perylene red residual layer 1320, and whiskers 1325 was contacted with the PVA adhesive layer 1310 using a hot press process to form a composite structure (105° C., 3.5 MPa, and 4 minutes). The polyimide substrate was removed, leaving the structure shown in FIG. 13B.

The PVA adhesive layer 1310 and the PVA in the intermediate layer 1307 was then removed using a water/IPA solution (H2O:IPA=1:1 weight ratio). The perylene red residual layer 1320 was removed by rinsing the whiskers with an H2O/NPA mixture.

An additional layer 1335 containing DuPont Nafion® DE2020 ionomer solution and desirable particles, such as Vulcan XC-72 carbon from Cabot Corporation or Pt/Vulcan TEC10V50E catalyst from Tanaka Kikinzoku Kogyo K. K was added as shown in FIG. 10D by coating an ink with the ionomer to Vulcan carbon weight ratio at 1.5 in a solvent of $H_2O$:EtOH:NPA=2:2:1 onto the whiskers matrix 1325.

Additional ionomer could be added by coating an ionomer solution as described in Example 1 to further adjust the ionomer content in the final electrode and build up a thick ionomer layer on the top of the whicker layer to improve the interface between the reconstructed nanostructured thin catalytic layer electrode and the PEM when the reconstructed electrode on the ePTFE decal is transferred to PEM so as to form a catalyst coated membrane.

Vacuum 1330 was applied during the removal of the adhesive layer, and/or the removal of the residual perylene red, and/or the deposition of the ionomer layer.

Figure 14A:
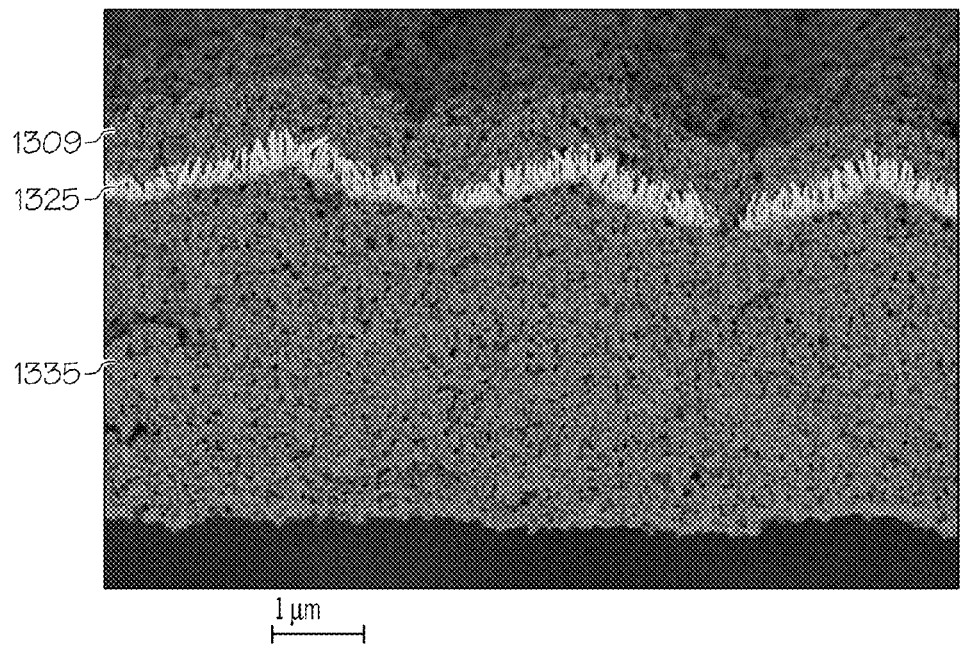
FIGS. 14A-B are SEM images of the cross-sections of embodiments of nanostructured thin catalytic layer on the porous transfer substrate made using the method of FIG. 13.
Figure 14B:
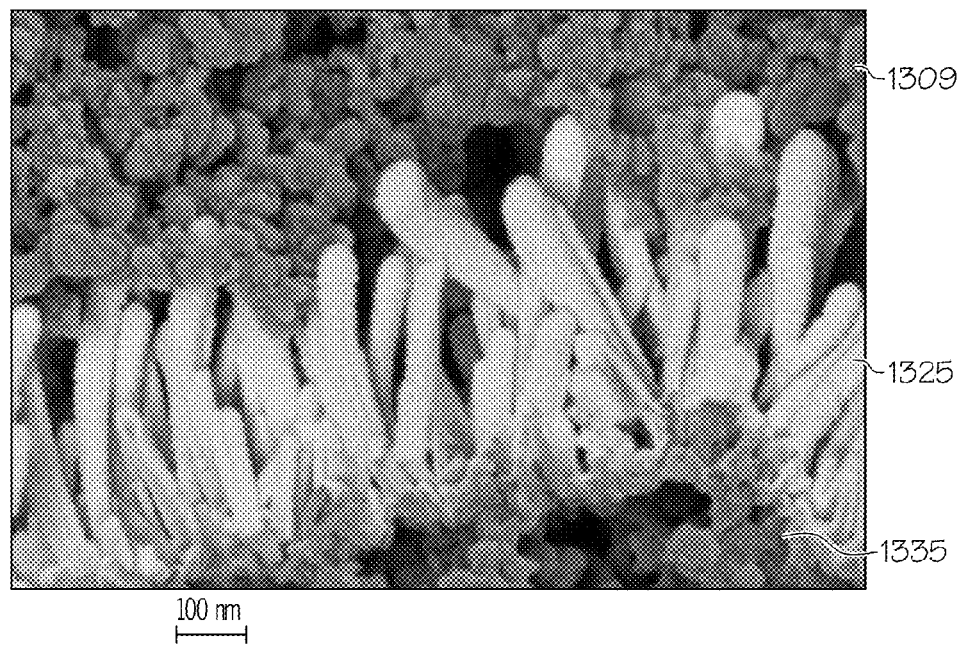
Figure 15A:
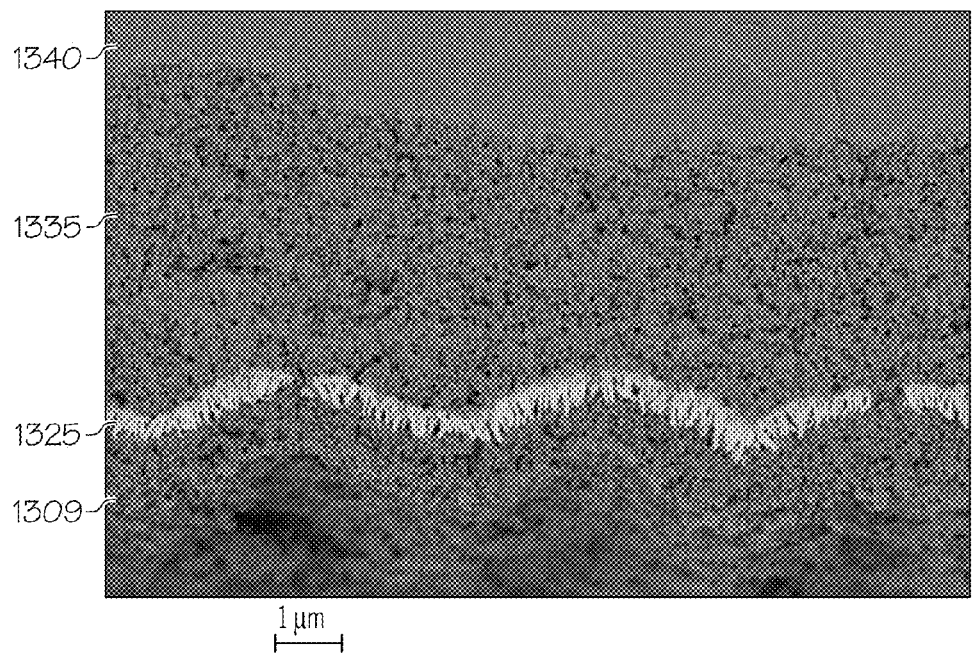
FIGS. 15A-B are SEM images of the cross-sections of embodiments of catalyst coated membrane made with porous nanostructured thin catalytic layer electrode decals of FIG. 14.
Figure 15B:
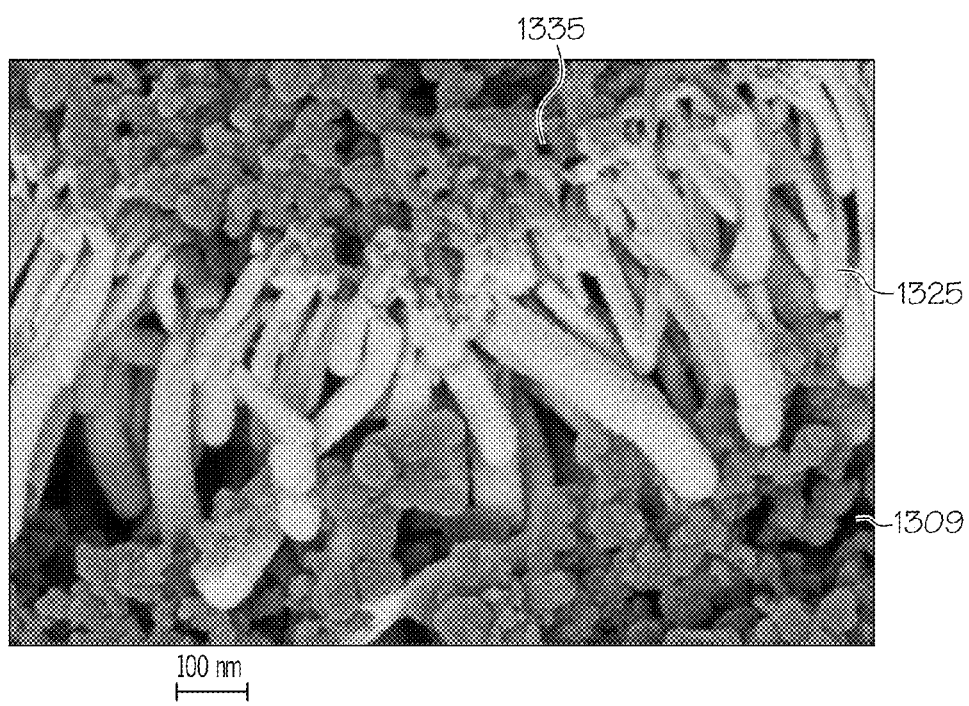
Figure 16A:
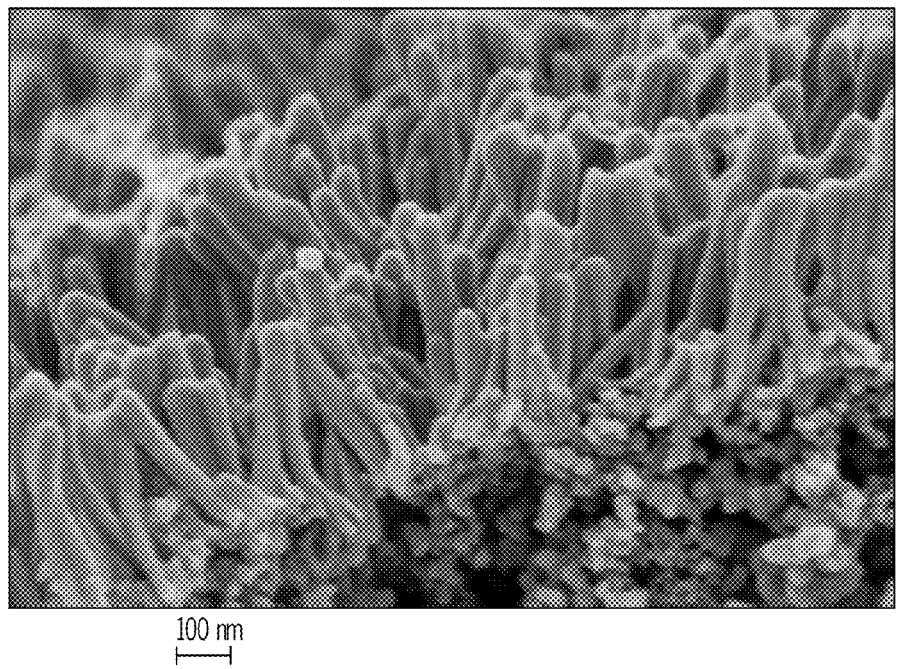
FIGS. 16A-D are SEM images showing ionomer films on the surface of the whiskers.
Figure 16B:
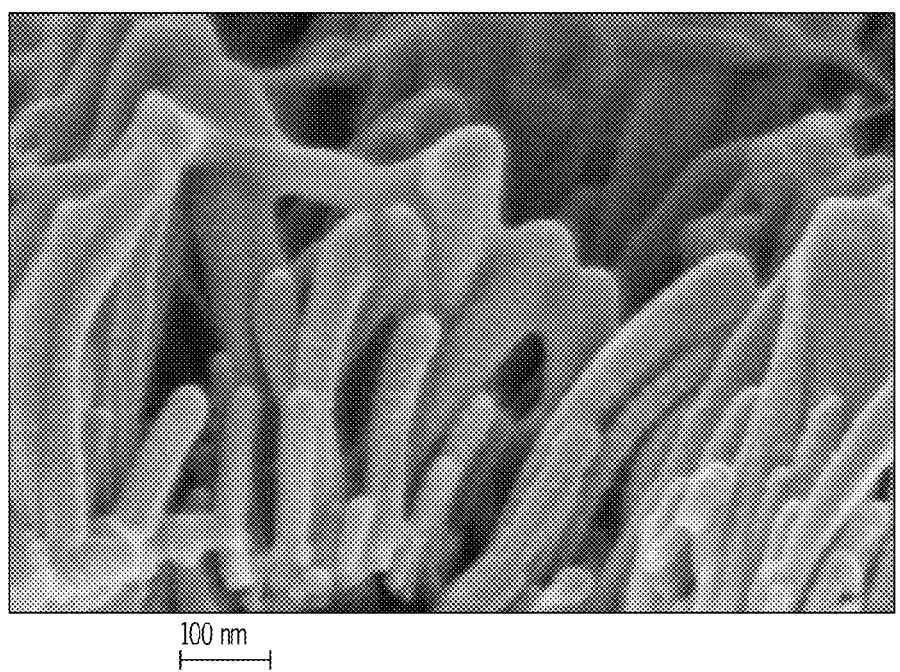
Figure 16C:
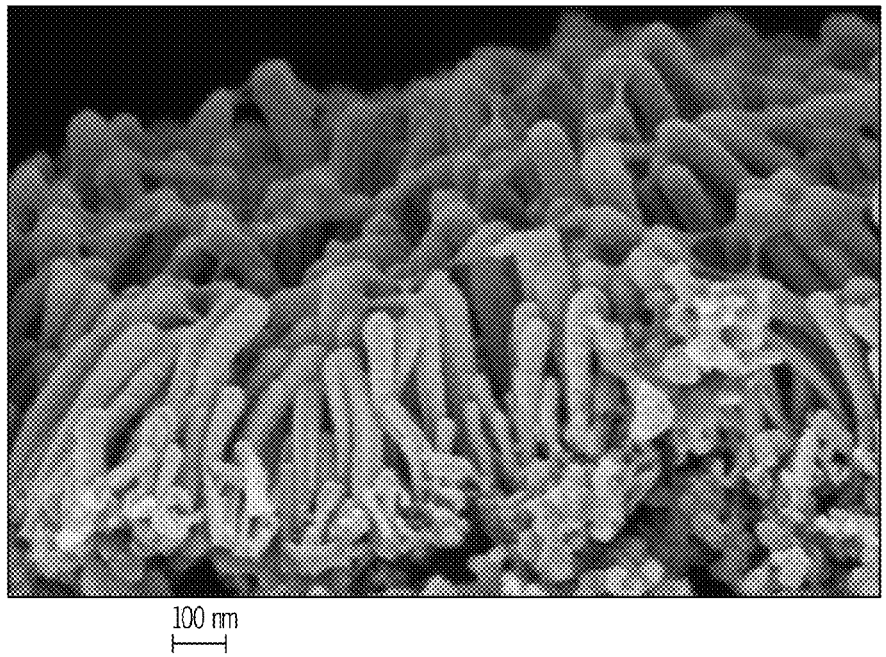
Figure 16D:
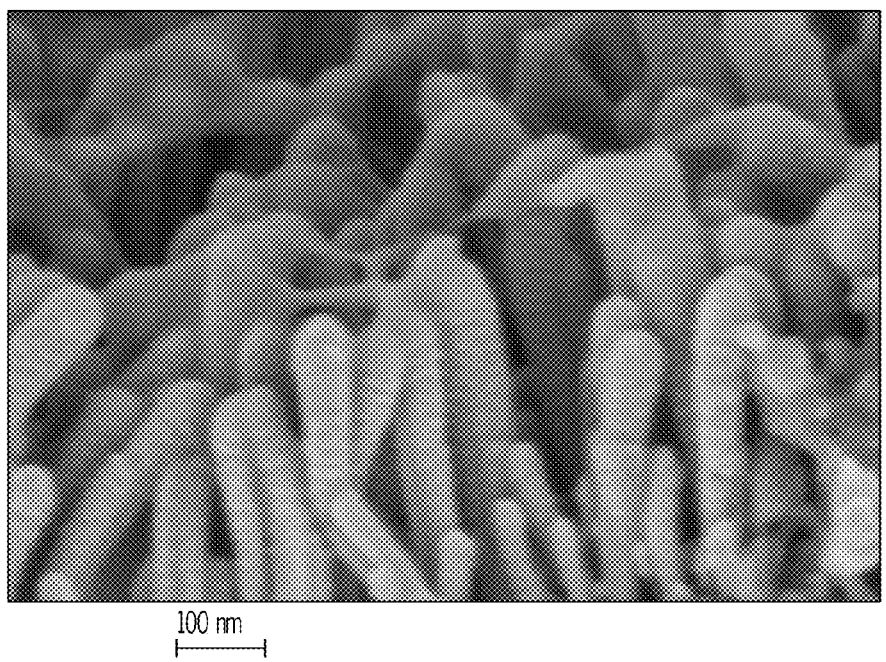
Figure 17A:
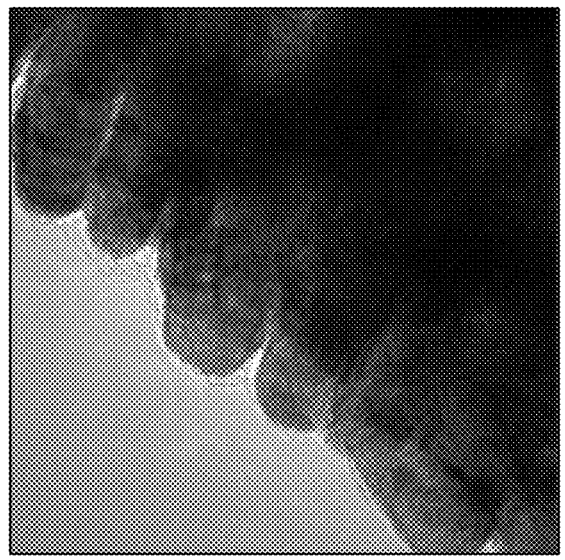
FIGS. 17A-D are TEM images showing ionomer films on the surface of the whiskers.
Figure 17B:
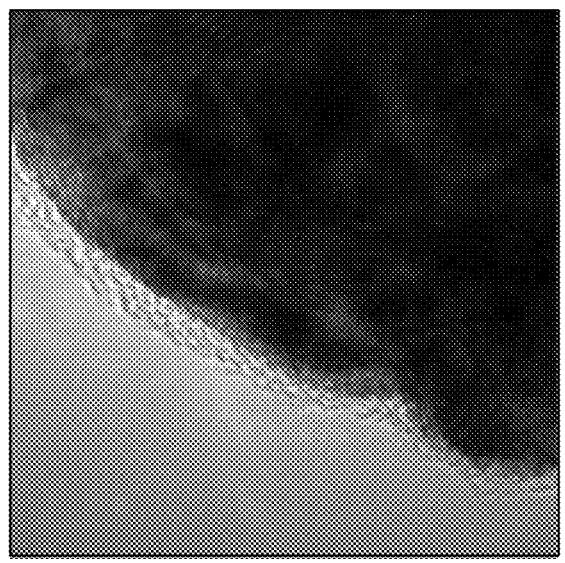
Figure 17C:
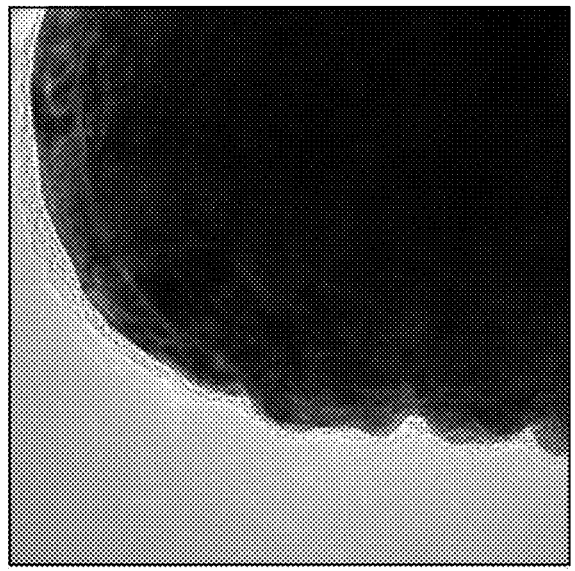
Figure 17D:
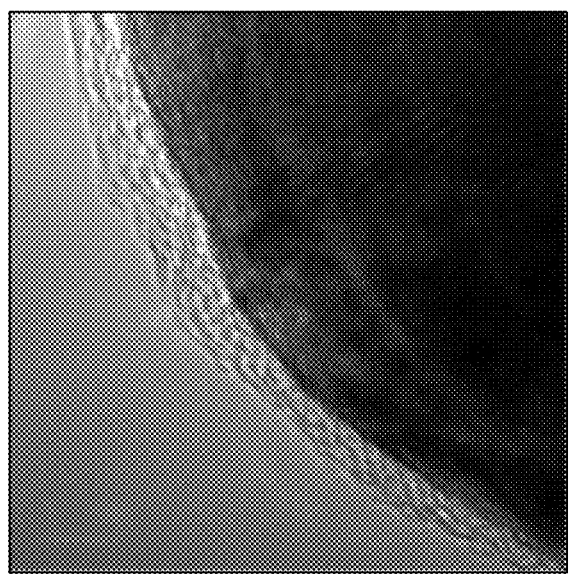

FIGS. 14A-B show SEM images of the reconstructed electrode containing the nanostructured thin catalytic layer on the porous ePTFE substrate of Example 4 with the whiskers 1325 sandwiched between the carbon layer 1309 and the carbon/ionomer layer 1335. FIGS. 15A-B show SEM images of catalyst coated membranes made using the reconstructed electrode decal containing the nanostructured thin catalytic layer of Example 4 by hot pressing the finished decal from FIG. 14 against a DuPont Nafion® NRE211 PEM. On PEM 1340 are carbon/ionomer layer 1335, the whiskers 1325, and exposed carbon layer 1309.

During the application of the ionomer solution or an ink containing ionomer and other particles, the ionomer will drain across the whisker layer and the intermediate layer to the pores of the porous substrate and thus coat a thin layer of ionomer on the particles in the intermediate layer and the surfaces of the individual whiskers, which would help the proton conduction during fuel cell operation.

FIGS. 16 and 17 show the formation of thin ionomer films on the surfaces of the whisker catalysts. FIGS. 16A-D are SEM images showing the ionomer layer on the whiskers. FIGS. 17A-D show TEM images of the ionomer layer on an individual whisker catalyst.

Figure 18:
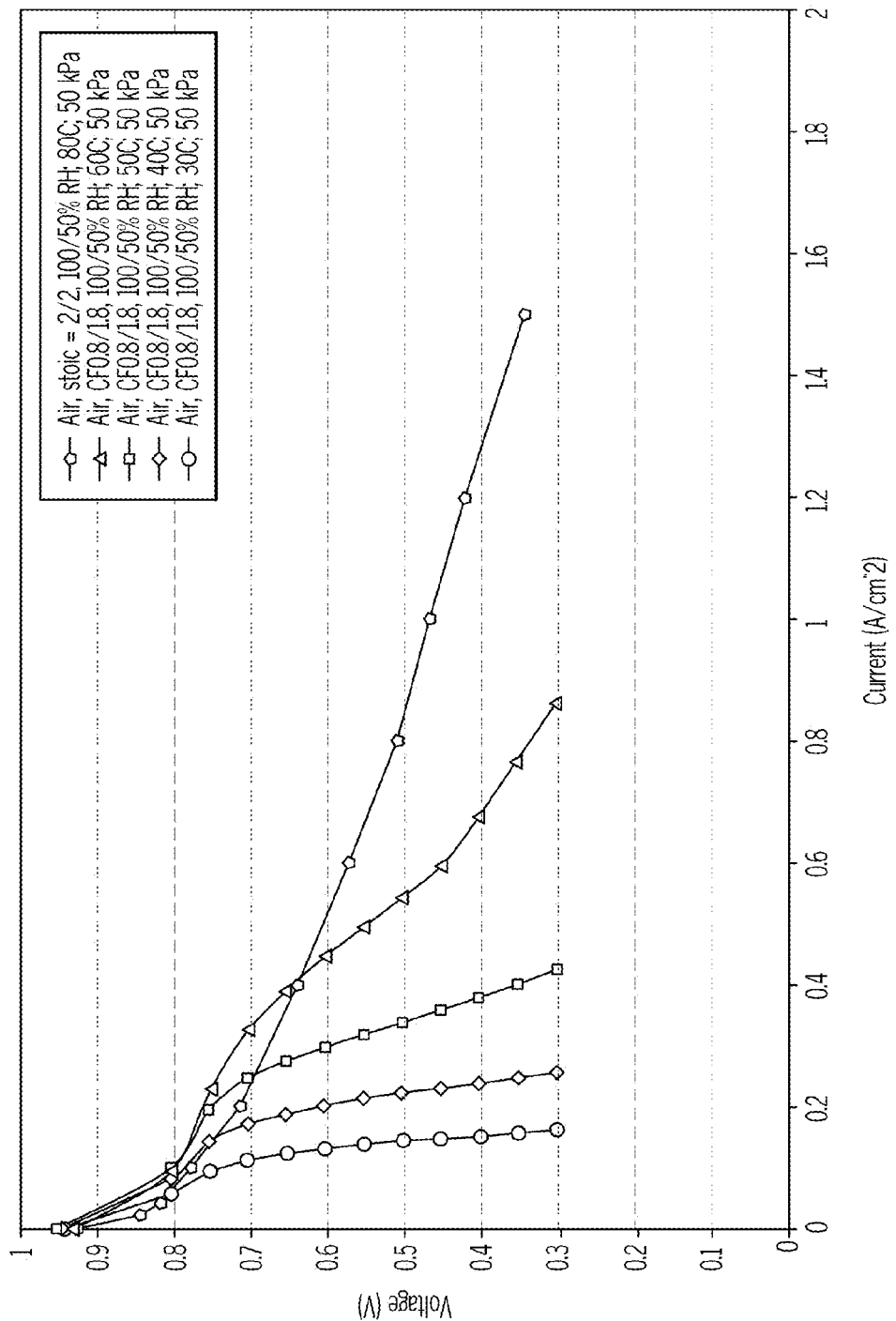
FIG. 18 is a graph showing the fuel cell performance of a prior art membrane electrode assembly by directly transferring the nanostructured thin catalytic layer to the PEM from the carrying substrate.
Figure 19:
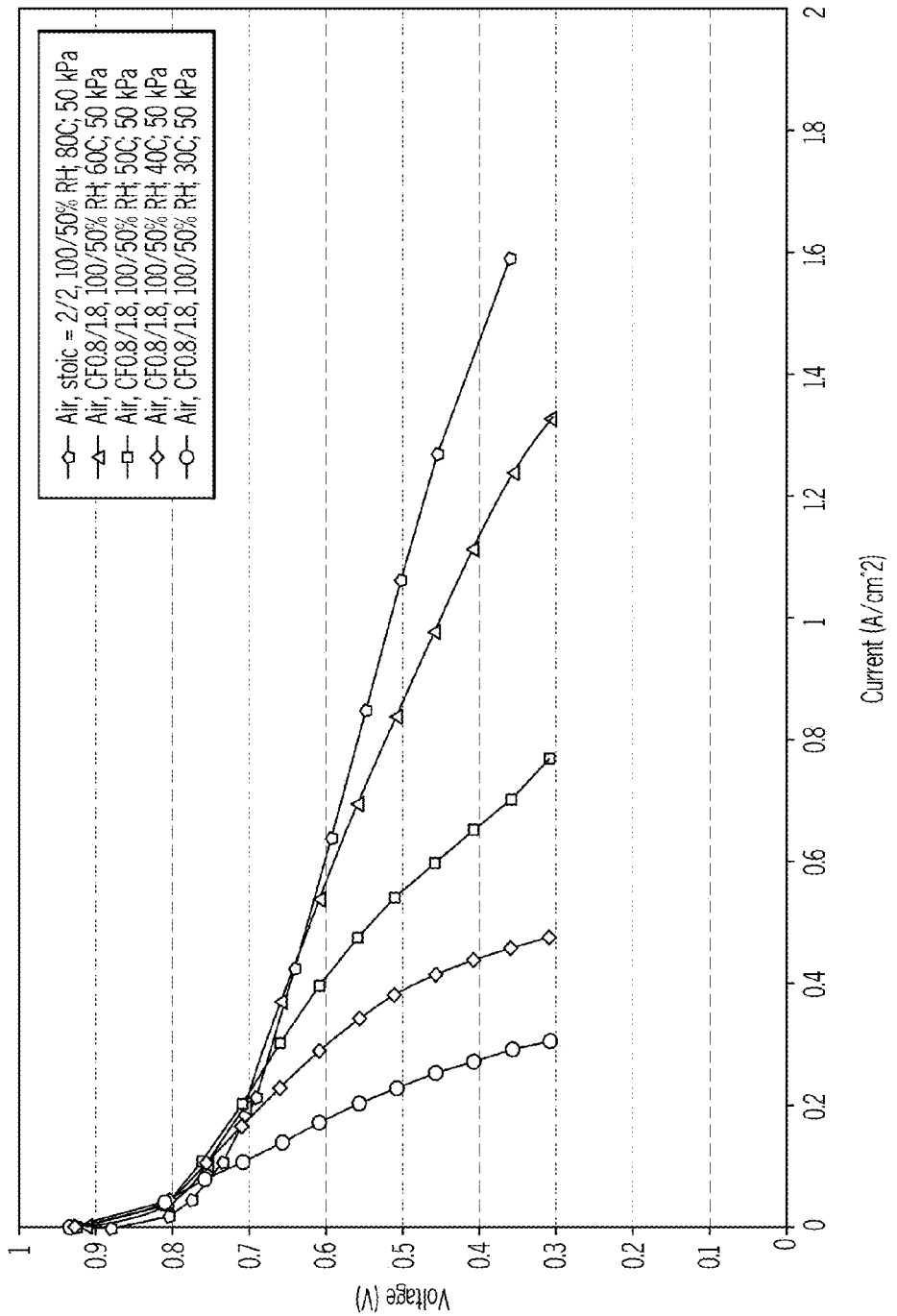
FIG. 19 is a graph showing the fuel cell performance of a membrane electrode assembly made using the electrode decal containing the nanostructured thin catalytic layer made according the embodiment of the present invention shown in FIG. 2.
Figure 20:
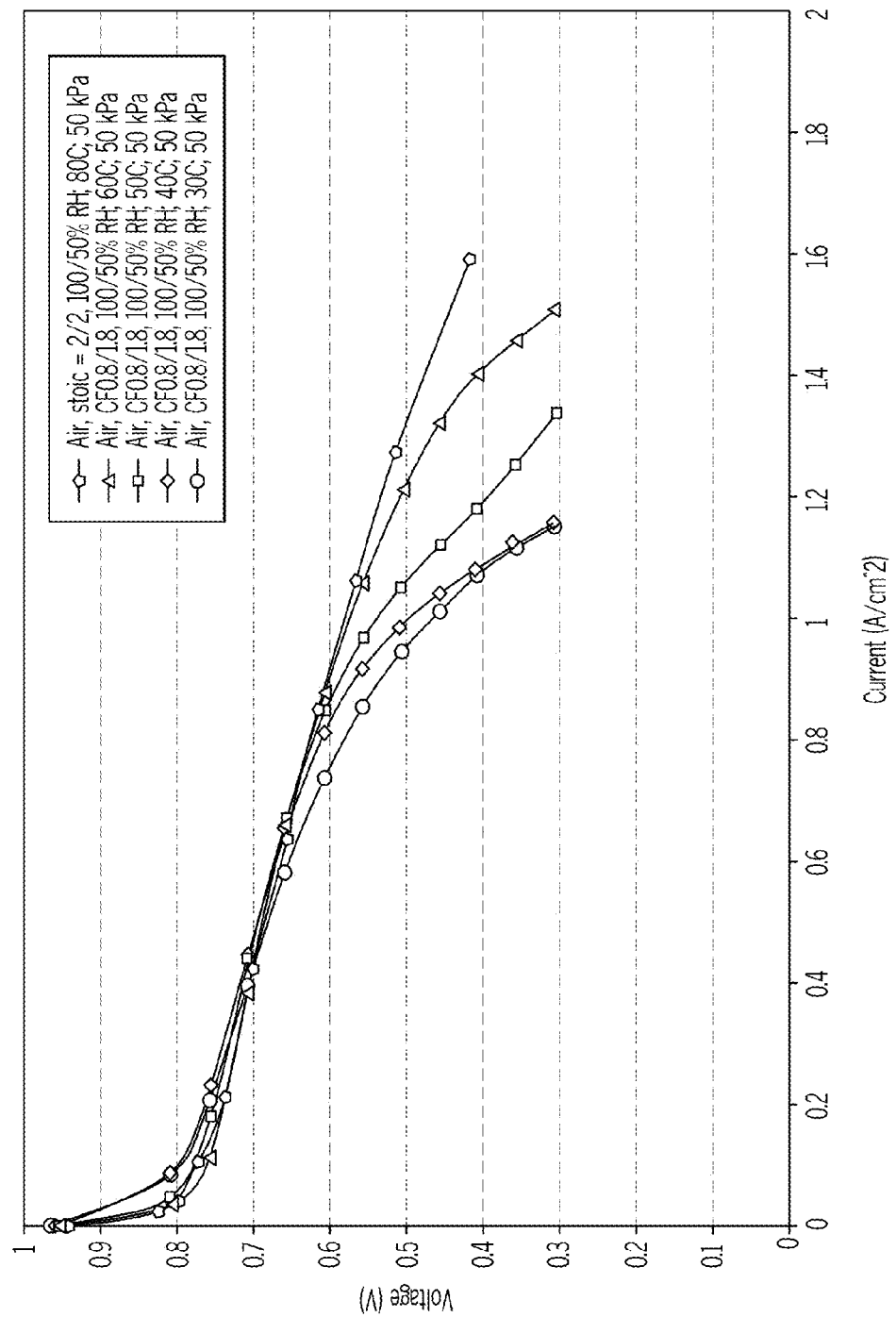
FIG. 20 is a graph showing the fuel cell performance of a membrane electrode assembly made using the electrode decal containing the nanostructured thin catalytic layer made according the embodiment of the present invention shown in FIG. 10.

FIG. 18 shows the performance of an MEA made using a nanostructure thin film electrode of the prior art made by transferring the 3M NSTF catalyst directly from the carrying substrate to the PEM for comparison. The Pt loading of the 3M NSTF catalytic layer is 0.15 mg/cm$^2$. FIG. 19 shows the performance of an MEA made using the reconstructed electrode containing the 3M NSTF catalyst layer on ePTFE decal of Example 1 which is fabricated with DuPont Nafion® DE2020 ionomer and Nafion® NRE211 proton exchange membrane. FIG. 20 shows the performance of an MEA made using the reconstructed electrode containing the 3M NSTF catalytic layer on ePTFE decal of Example 3 which is also fabricated with DuPont Nafion® DE2020 ionomer and Nafion® NRE211 proton exchange membrane. The layer between the NSTF catalytic layer and the membrane is 0.04 mg Pt/cm$^2$ TKK TEC10V50E Pt/Vulcan catalyst mixed with DuPont Nafion® DE2020 ionomer which is about 1 micron thick. As shown in FIGS. 19 and 20, these MEAs were tested at various temperatures with the same cell inlet relative humidity at all tested temperatures, 100% for the anode side and 50% for the cathode side.

The reconstructed 3M NSTF electrode of Example 1 tested showed the same HAD (hydrogen adsorption/desorption) area as the prior art MEA by compressing the 3M NSTF catalyst layer directly on the proton exchange membrane, which is greater than or equal to 10 m$^2$/g Pt after a break-in protocol. All of the reconstructed electrodes containing the nanostructured thin catalytic layers showed similar HAD areas when the scan was run to 0.6V and 1.1V versus SHE reference electrode during cyclovoltammetry measurements. It indicates that no contaminants were introduced into the reconstructed electrode containing the nanostructure thin catalytic layer since most of the contaminants would be oxidized at 1.1V if present and result in an increased HAD area.

As it can be seen in FIG. 19, the performance of the electrode fabricated with the prior art method is very poor at low temperatures, which represents high humidity operation conditions.

For the performance of the reconstructed electrode of Example 1, by cleaning the residual perylene red layer, inverting the whisker layer and adding a little ionomer into the whisker matrix as shown in FIG. 20, we can see the improved performance at low temperatures and comparable performance at high temperatures when compared to the electrode fabricated with the prior art as shown in FIG. 19.

A significant improvement is demonstrated in FIG. 20 when a 1 micron thick layer of Pt/Vulcan catalyst mixed with ionomer is added between the 3M NSTF catalytic layer and the membrane with ionomer added to both the whisker layer and the Pt/Vulcan catalyst layer. Good performance was observed across the entire temperature range, from wet to dry operating conditions.

The various embodiments of the processes of the present invention take advantage of the uniformly distributed catalyst or distributed in a desirable pattern on the carrying substrate produced using prior art processes. These embodiments avoid re-dispersing the nanostructured catalysts. They allow further cleaning of the catalyst layer (e.g., removing the residual materials used to produce the nanostructure supports, such as non crystallized perylene red backing of the 3M NSTF catalyst layer or residual catalyst or materials to fabricate the carbon nanotubes or nanofibers). Additional components or layers can be added into the nanostructured thin catalytic layer by coating on the stripped nanostructured thin catalyst layer on the porous transfer substrate or pre-coating the porous transfer substrate with a mixture of particles and adhesive. Since all of the processes are carried out on the porous transfer substrate, this invention is well suited for a continuous process and mass production.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of transferring a nanostructured thin catalytic layer from a carrying substrate to a transfer substrate comprising:
   providing an electrocatalyst decal comprising a carrying substrate having the nanostructured thin catalytic layer thereon, the nanostructured thin catalytic layer having a first surface and a second surface, the first surface of the nanostructured thin catalytic layer adjacent to the carrying substrate;
   providing a porous transfer substrate with an adjacent adhesive layer;
   adhering the second surface of the nanostructured thin catalytic layer adjacent to the adhesive layer to form a composite structure;
   removing the carrying substrate from the composite structure such that a residual layer formed on the first surface of the nanostructured thin catalytic layer of the electrocatalyst decal becomes exposed; and
   removing the adhesive layer from the composite structure and further removing the residual layer from the composite structure to form a reconstructed electrode decal comprising the porous transfer substrate and the nanostructured thin catalytic layer, wherein the second surface of the nanostructured thin catalytic layer is adjacent to the porous transfer substrate.

2. The method of claim 1 further comprising coating a solution onto the nanostructured thin catalytic layer after the carrying substrate and the adhesive layer have been removed, the solution forming an additional layer on the first surface of the nanostructured thin catalytic layer.

3. The method of claim 2 wherein the solution includes at least one of an ionomer, carbon powder, carbon fibers, a catalyst, titanium dioxide, silica, nanofibers, or nanotubes.

4. The method of claim 1 wherein an intermediate layer is deposited on the transfer substrate before the adhesive layer is deposited, the intermediate layer comprising one or more of adhesive, ionomer, carbon powder, carbon fiber, a catalyst, titanium dioxide, silica, nanofibers, or nanotubes.

5. The method of claim 4 wherein the intermediate layer includes adhesive, further comprising removing the adhesive in the intermediate layer from the composite to form a residual intermediate layer after the carrying substrate is removed, and wherein the residual intermediate layer is positioned between the transfer substrate and the nanostructured thin catalytic layer.

6. The method of claim 4 wherein the adhesive in the intermediate layer is removed simultaneously with the adhesive layer.

7. The method of claim 1 wherein the second surface of the nanostructured thin catalytic layer is adhered adjacent to the adhesive layer using a hot press process.

8. The method of claim 1 wherein the adhesive layer further comprises at least one of ionomer, carbon powder, carbon fiber, a catalyst, titanium dioxide, silica, nanofibers, or nanotubes.

9. The method of claim 1 wherein the adhesive layer is thicker than a surface feature of the carrying substrate.

10. The method of claim 1 further comprising applying a vacuum while removing the adhesive layer.

11. The method of claim 1 wherein the adhesive layer comprises a water soluble adhesive.

12. A method of fabricating a catalyst coated membrane comprising:
   providing an electrocatalyst decal comprising a carrying substrate having a nanostructured thin catalytic layer thereon, the nanostructured thin catalytic layer having a first surface and a second surface, the first surface of the nanostructured thin catalytic layer adjacent to the carrying substrate;

providing a porous transfer substrate with an adjacent adhesive layer;

adhering the second surface of the nanostructured thin catalytic layer adjacent to the adhesive layer to form a composite structure;

removing the carrying substrate from the composite structure such that a residual layer formed on the first surface of the nanostructured thin catalytic layer of the electrocatalyst decal becomes exposed; and removing the adhesive layer from the composite structure and further removing the residual layer from the composite structure to form a reconstructed electrode decal comprising the porous transfer substrate and the nanostructured thin catalytic layer, wherein the second surface of the nanostructured thin catalytic layer is adjacent to the porous transfer substrate;

providing a proton exchange membrane; and transferring the nanostructured thin catalytic layer from the electrode decal to a first surface of the proton exchange membrane after the residual layer has been removed from the composite structure, the first surface of the nanostructured thin catalytic layer being adjacent to the first surface of the proton exchange membrane.

13. The method of claim 12 further comprising transferring a second nanostructured thin catalytic layer from a second transfer substrate to a second surface of the proton exchange membrane, the first surface of the second nanostructured thin catalytic layer being adjacent to the second surface of the proton exchange membrane, and removing the second transfer substrate.

14. The method of claim 12 wherein the nanostructured thin catalytic layer is transferred to the proton exchange membrane by adhering the first surface of the nanostructured thin catalytic layer adjacent to the first surface of the proton exchange membrane and attaching the nanostructured thin catalytic layer to the first surface of the proton exchange membrane using a hot press process, and removing the transfer substrate.

15. The method of claim 12 wherein an intermediate layer is deposited on the transfer substrate before the adhesive layer is deposited, the intermediate layer comprising one or more of adhesive, ionomer, carbon powder, carbon fiber, a catalyst, titanium dioxide, silica, nanofibers, or nanotubes.

16. The method of claim 12 further comprising coating a solution onto the nanostructured thin catalytic layer of the reconstructed electrode decal after the carrying substrate and the adhesive layer have been removed, the solution forming an additional layer on the first surface of the nanostructured thin catalytic layer, wherein the solution includes at least one of an ionomer, carbon powder, carbon fibers, a catalyst, titanium dioxide, silica, nanofibers, or nanotubes.

17. A reconstructed electrode decal comprising:

a porous transfer substrate; and a nanostructured thin catalytic layer, having a first surface and a second surface, the nanostructured thin catalytic layer having been transferred from a carrying substrate, the first surface having been adjacent to the carrying substrate wherein the carrying substrate having been removed forms a composite structure such that an exposed residual layer formed on the first surface of the nanostructured thin catalytic layer having been removed, and wherein the second surface of the nanostructured thin catalytic layer is adjacent to the porous transfer substrate.

18. The electrode decal of claim 17 further comprising an additional layer on the first surface of the nanostructured thin catalytic layer, wherein the additional layer includes at least one of ionomer, carbon powder, carbon fiber, a catalyst, titanium dioxide, silica, nanofibers, or nanotubes.

19. The electrode decal of claim 17 further comprising an intermediate layer between the transfer substrate and the nanostructured thin catalytic layer, wherein the intermediate layer includes at least one of ionomer, carbon powder, carbon fiber, a catalyst, titanium dioxide, silica, nanofibers, or nanotubes.

* * * * *